(12) United States Patent
Bertolina et al.

(10) Patent No.: US 12,010,736 B2
(45) Date of Patent: Jun. 11, 2024

(54) SMART WIRELESS ADAPTER

(71) Applicant: Schneider Electric Systems USA, Inc., Foxboro, MA (US)

(72) Inventors: Mark V. Bertolina, Milton, MA (US); Richard P. Casimiro, North Kingstown, RI (US); Patrick Cupo, Scottsdale, AZ (US); Lee Matthew Carrara, Canton, MA (US)

(73) Assignee: Schneider Electric Systems USA, Inc., Foxboro (MA)

( * ) Notice: Subject to any disclaimer, the term of this patent is extended or adjusted under 35 U.S.C. 154(b) by 0 days.

(21) Appl. No.: 17/125,396

(22) Filed: Dec. 17, 2020

(65) Prior Publication Data
US 2021/0195660 A1 Jun. 24, 2021

Related U.S. Application Data

(60) Provisional application No. 62/951,787, filed on Dec. 20, 2019.

(51) Int. Cl.
*H04W 76/10* (2018.01)
*G05B 19/418* (2006.01)
(Continued)

(52) U.S. Cl.
CPC ...... *H04W 76/10* (2018.02); *G05B 19/41855* (2013.01); *H04L 67/141* (2013.01);
(Continued)

(58) Field of Classification Search
CPC ..... H04W 88/06; H04W 74/00; H04W 76/12; H04L 67/02; G05B 2219/31138; G05B 2219/31184
See application file for complete search history.

(56) References Cited

U.S. PATENT DOCUMENTS 7,106,816 B2 * 9/2006 Filipovic ............... H04B 1/406
375/349
7,424,403 B2 * 9/2008 Robinson ............... G01H 1/00
73/66
(Continued)

FOREIGN PATENT DOCUMENTS

CN 205986936 U 2/2017
CN 110224898 A 9/2019
(Continued)

OTHER PUBLICATIONS

International Search Report and Written Opinion dated Mar. 16, 2021 for International Application No. PCT/US2020/065728, 26 pages.
(Continued)

*Primary Examiner* — Chirag R Patel
(74) *Attorney, Agent, or Firm* — Locke Lord LLP

(57) ABSTRACT

Smart Wireless Adapters are provided herein for establishing communication between measurement devices and a measurement control and data acquisition system in an industrial system. In one aspect, a method of establishing communication between a Pneumatic or Analog measurement device and the measurement control and data acquisition system includes providing a Pneumatic or Analog measurement device and providing a Smart Wireless Adapter capable of electrically and mechanically coupling to the Pneumatic or Analog measurement device. The Pneumatic or Analog measurement device is configured to measure one or more parameters in the industrial system and provide a value or signal indicative of the measured parameters at an output of the Pneumatic or Analog measurement device. Additionally, the Smart Wireless Adapter is coupled to receive the value or signal from the Pneumatic or Analog measurement device and configured to wirelessly transmit data indicative of the
(Continued)

value or signal to the measurement control and data acquisition system.

23 Claims, 12 Drawing Sheets

(51) Int. Cl.
*H04L 67/141* (2022.01)
*H04Q 9/00* (2006.01)
*H04W 84/18* (2009.01)

(52) U.S. Cl.
CPC ..... *H04Q 9/00* (2013.01); *G05B 2219/31162* (2013.01); *G05B 2219/32406* (2013.01); *H04Q 2209/43* (2013.01); *H04W 84/18* (2013.01)

(56) References Cited

U.S. PATENT DOCUMENTS

| | | | |
|---|---|---|---|
| 7,675,935 B2* | 3/2010 | Samudrala | G05B 19/4185 370/466 |
| 7,962,100 B2* | 6/2011 | Isenmann | G08C 17/02 455/39 |
| 9,702,732 B2 | 7/2017 | Repyevsky et al. | |
| 2003/0236579 A1 | 12/2003 | Hauhia et al. | |
| 2005/0007249 A1 | 1/2005 | Eryurek et al. | |
| 2005/0066104 A1* | 3/2005 | Train | G05B 19/4186 710/305 |
| 2005/0245291 A1 | 11/2005 | Brown et al. | |
| 2009/0279434 A1* | 11/2009 | Aghvami | H04L 47/10 370/235 |
| 2010/0050017 A1 | 2/2010 | Almadi et al. | |
| 2012/0102240 A1* | 4/2012 | Wei | G06F 13/362 710/30 |
| 2013/0027237 A1* | 1/2013 | Washiro | H03M 1/02 341/155 |
| 2013/0111528 A1* | 5/2013 | Baskaran | H04N 21/4884 725/61 |
| 2014/0335844 A1* | 11/2014 | Kang | H04W 52/0258 455/418 |
| 2016/0119846 A1 | 4/2016 | Chou et al. | |
| 2016/0366010 A1* | 12/2016 | Hamber | H04L 12/2816 |
| 2017/0064042 A1* | 3/2017 | Vora | H04W 4/70 |
| 2018/0183701 A1* | 6/2018 | Qi | H04W 40/246 |
| 2019/0312974 A1 | 10/2019 | Soundar | |
| 2020/0185812 A1 | 6/2020 | Schauble et al. | |
| 2021/0081346 A1* | 3/2021 | Nixon | H04L 69/18 |

FOREIGN PATENT DOCUMENTS

| | | |
|---|---|---|
| EP | 2215535 B1 | 5/2017 |
| WO | 2021047885 A1 | 3/2021 |

OTHER PUBLICATIONS

Extended European Search Report dated Nov. 15, 2022 for corresponding European Patent Application No. 20901507.2-1213, 10 pages.

* cited by examiner

SMART WIRELESS ADAPTER

CROSS REFERENCE TO RELATED APPLICATION

This application claims the benefit of and priority to U.S. Provisional Application No. 62/951,787, filed on Dec. 20, 2019 under 35 U.S.C. § 119(e), which application is incorporated by reference herein in its entirety.

FIELD

This disclosure relates generally to industrial equipment, and more particularly, to systems and methods related to a Smart Wireless Adapter for establishing/enabling wireless communication between measurement devices (e.g., Pneumatic, Analog and/or digital Smart measurement devices) and measurement control and data acquisition systems (e.g., Distributed Control Systems (DCSs)) in an industrial system.

BACKGROUND

As is known, an industrial operation typically includes a plurality of industrial equipment. The industrial equipment can come in a variety of forms and may be of varying complexities, for example, depending on the industrial operation. For example, industrial process control and monitoring measurement devices are typically utilized to measure process variable measurements such as pressure, flow, level, temperature and analytical values in numerous industrial applications and market segments throughout Oil & Gas, Energy, Food & Beverage, Water & Waste Water, Chemical, Petrochemical, Pharmaceutical, Metals, Mining and Minerals and other industry applications.

Field Devices have evolved over the years from Pneumatic to Analog to Smart measurement devices. Pneumatic and Analog measurement devices are typically considered as non-smart measurement devices. For example, Pneumatic measurement devices can be coupled with a Pneumatic pressure-to-current converter (P/I converter) to convert a pressure input to a current output measurement. Additionally, Analog measurement devices typically provide for a current or voltage measurement output. Smart measurement devices, in contrast, typically include digital electronics with various communication protocols such as Modbus, Foundation Fieldbus, Profibus, HART and WirelessHART to digitally communicate process variable measurements (e.g., pressure, temperature, flow rate, etc.) to various types of measurement control and data acquisition systems (e.g., supervisory control and data acquisition (SCADA) systems).

There are many industrial operations that still use Pneumatic and/or Analog measurement devices. It is desirable to enable these Pneumatic and/or Analog measurement devices to digitally communicate with measurement control and data acquisition systems (e.g., DCS systems) and/or other systems and/or devices (e.g., digital Smart measurement devices) in the industrial operations, for example, without requiring replacement and/or major overhaul of the Pneumatic and/or Analog measurement devices. It is also desirable to fully digitally integrate digital Smart measurement devices with the measurement control and data acquisition systems. For example, as is known, diagnostics available with many digital Smart measurement devices communicating protocols such as Modbus, Foundation Fieldbus, Profibus, HART and WirelessHART are not fully digitally integrated with control systems. For example, the digital Smart measurement device may be utilized only for its digitally converted Analog 4-20 mA measurement output, leaving the available device diagnostics stranded or not utilized. As a result, the control systems are not taking advantage of available device diagnostics.

SUMMARY

Described herein are systems and methods related to a Smart Wireless Adapter for establishing/enabling wireless communication between measurement devices (e.g., Pneumatic, Analog and/or digital Smart measurement devices) and measurement control and data acquisition systems and/or other systems and/or devices in an industrial system.

In one aspect, a method of establishing communication between a Pneumatic or Analog measurement device and a measurement control and data acquisition system in an industrial system includes providing a Pneumatic or Analog measurement device and providing a Smart Wireless Adapter capable of electrically and mechanically coupling to the Pneumatic or Analog measurement device. The Pneumatic or Analog measurement device is configured to measure one or more parameters in the industrial system and provide a value or signal indicative of the measured parameters at an output of the Pneumatic or Analog measurement device. Additionally, the Smart Wireless Adapter is coupled to receive the value or signal from the Pneumatic or Analog measurement device and configured to wirelessly transmit data indicative of the value or signal to the measurement control and data acquisition system.

In accordance with some embodiments of the disclosure, the Smart Wireless Adapter is capable of being removably coupled to and from the Pneumatic or Analog measurement device, for example, using a threading means. Additionally, in accordance with some embodiments of the disclosure, the Smart Wireless Adapter is received in a socket or opening (e.g., threaded opening) formed in the Pneumatic or Analog measurement device. Further, in accordance with some embodiments of the disclosure, the Smart Wireless Adapter is capable of being removably coupled to and from the Pneumatic or Analog measurement device using a clamping means or other attachment means known to one of ordinary skill in the art.

In accordance with some embodiments of this disclosure, prior to wirelessly transmitting the data indicative of the value or signal to the measurement control and data acquisition system, the data indicative of the value or signal is converted into a data form in accordance with one or more preferred modes of communication of the measurement control and data acquisition system. In one embodiment, the preferred mode(s) of communication may be communicated from the measurement control and data acquisition system to the Smart Wireless Adapter. In one embodiment, the preferred mode(s) of communication include a plurality of preferred modes of communication. In this embodiment, the Smart Wireless Adapter may select one or more of the plurality of preferred modes of communication, and the data indicative of the value or signal may be converted into the data form based on the selected mode(s) of communication.

In another embodiment, the preferred mode(s) of communication may be learned by the Smart Wireless Adapter. For example, the preferred mode(s) of communication may be learned based on a series of test communications occurring between the Smart Wireless Adapter and the measurement control and data acquisition system. In one embodiment, the preferred mode(s) of communication may be identified/learned based on an evaluation of data collected during the series of test communications with respect to information relating to possible modes of communication from a library of possible modes of communication. The library of possible modes of communication may be stored on a memory device associated with the Smart Wireless Adapter, for example.

In accordance with some embodiments of this disclosure, the data form into which the data indicative of the value or signal may be converted is further selected from a variety of data forms that the Smart Wireless Adapter is capable of generating and transmitting. The variety of data forms may include, for example, data forms suitable for transmission using one or more of Bluetooth, Zigbee, LoRaWAN, WiFi, WirelessHART, RFID and Cellular wireless communication protocols. It is understood that other possible data forms are of course possible.

In accordance with some embodiments of this disclosure, the method further includes receiving signals/data from the measurement control and data acquisition system on the Smart Wireless Adapter in a first data form, and providing data indicative of the received signals/data to the Pneumatic or Analog measurement device in a second data form. The first data form may be a form suitable for interpretation by the Smart Wireless Adapter, for example. Additionally, the second data form may be a form suitable for interpretation by the Pneumatic or Analog measurement device, for example. In some embodiments, the first and second data forms may be the same as or similar to each other. In other embodiments, the first and second data forms may be different from each other. In accordance with some embodiments of this disclosure, the signals/data received from the measurement control and data acquisition system may be used to control one or more aspects (e.g., parameters) of the measurement device and/or to control one or more aspects of systems or devices associated with the measurement device. For example, the measurement device and/or other systems or devices may be controlled to optimize or otherwise improve operation of the measurement device and/or other systems or devices.

A Smart Wireless Adapter for establishing communication between a Pneumatic or Analog measurement device and a measurement control and data acquisition system in an industrial system is also provided herein. The Smart Wireless Adapter includes at least one processor and at least one memory device coupled to the at least one processor. The at least one processor and the at least one memory device are configured to receive a value or signal indicative of one or more parameters measured by the Pneumatic or Analog measurement device. Additionally, the at least one processor and the at least one memory device are configured to wirelessly transmit data indicative of the value or signal to the measurement control and data acquisition system.

A Smart Wireless adapter for establishing communication between a digital Smart measurement device and a measurement control and data acquisition system in an industrial system is also provided herein. The Smart Wireless Adapter includes at least one processor and at least one memory device coupled to the at least one processor. The at least one processor and the at least one memory device are configured to receive signals indicative of one or more parameters measured by the digital Smart measurement device. The signals may include both analog and digital signals, for example. The analog signal(s) may be received by a signal path at an input and the signal path may be configured to generate a digital signal (or digital signals) indicative of the analog signal(s) at an output. Additionally, the digital signal(s) from the digital Smart measurement device (i.e., not the digital signal(s) generated by the signal path) may be received by a modem (or other means for modulating and demodulating electrical signals). The modem may generate a signal (or signals) indicative of the digital signal(s) at an output. The at least one processor is responsive to the digital signal(s) from the signal path and to the signal(s) from the modem to generate one or more output signals. The output signal(s), or signal(s) indicative of the output signal(s), are wirelessly transmitted to the measurement control and data acquisition system, for example, via an antenna of the Smart Wireless Adapter.

In accordance with some embodiments of this disclosure, the digital signal(s) from the digital Smart measurement device may include diagnostic information associated with the digital Smart measurement device (e.g., health and status information of the measurement device, the industrial system including the measurement device, etc.). In these embodiments, the measurement control and data acquisition system may analyze the diagnostic information, for example, based on an analysis of the output signal(s), or signal(s) indicative of the output signal(s), received from the Smart Wireless Adapter coupled to the digital Smart measurement device. In some embodiments, one or more actions may be taken based on analysis of the diagnostic information. For example, in some embodiments it may be desirable to provide a communication (e.g., text, email, etc.) indicating information learned from the diagnostic information, for example, issues with the digital Smart measurement device and/or other systems or devices in the industrial system. Additionally, in some embodiments it may be desirable to generate alarms and/or automatically adjust one or more parameters associated with the digital Smart measurement device and/or other systems or devices in the industrial system based on the information learned from the diagnostic information.

In accordance with some embodiments of the disclosure, the above and below discussed Smart Wireless Adapters each include a threaded portion (or other coupling means, such as a clamp or socket type connection) capable of being received onto (or otherwise being mechanically coupled to) a corresponding portion of the measurement device to which the Smart Wireless Adapter is configured to be coupled (e.g., by rotation in clockwise or counterclockwise direction(s), push-pull force(s), etc.). Additionally, in accordance with some embodiments of the disclosure, the at least one processor and the at least one memory device of the Smart Wireless Adapters are further configured to: prior to wirelessly transmitting the data (or signal(s)) indicative of the value or signal to the measurement control and data acquisition systems to which the Smart Wireless Adapters are configured to be coupled, convert the value or signal indicative of the measured parameters to a data form suitable for transmission to and receipt by the measurement control and data acquisition systems.

In accordance with some embodiments of the disclosure, the Smart Wireless Adapters further include one or more sensing devices configured to sense one or more parameters (e.g., temperature, vibration, etc.) associated with the industrial system. In accordance with some embodiments of the disclosure, the Smart Wireless Adapters are configured to wirelessly transmit data (or signal(s)) indicative of the sensed parameters to the measurement control and data acquisition systems to which the Smart Wireless Adapters are configured to be coupled.

As used herein, the term "processor" is used to describe an electronic circuit that performs a function, an operation, or a sequence of operations. The function, operation, or sequence of operations can be hard coded into the electronic circuit or soft coded by way of instructions held in a memory device. A processor can perform the function, operation, or sequence of operations using digital values or using analog signals.

In some embodiments, the processor can be embodied, for example, in a specially programmed microprocessor, a digital signal processor (DSP), or an application specific integrated circuit (ASIC), which can be an analog ASIC or a digital ASIC. Additionally, in some embodiments the processor can be embodied in configurable hardware such as FPGAs or programmable logic arrays (PLAs). In some embodiments, the processor can also be embodied in a microprocessor with associated program memory. Furthermore, in some embodiments the processor can be embodied in a discrete electronic circuit, which can be an analog circuit, a digital circuit or a combination of an analog circuit and a digital circuit. The processor may be coupled to one or more memory devices, with the processor and the memory device(s) configured to implement the above-discussed method.

As noted above, and as further described in the Detailed Description section, Pneumatic and Analog measurement devices are inherently not smart and cannot digitally communicate to measurement control and data acquisition systems. As also noted above, and as further described in the Detailed Description section, it desirable to take advantage of the diagnostic information available on digital Smart measurement devices that is typically not being taken advantage of. Disclosed herein are various embodiments of Smart Wireless Adapters. In one aspect of this disclosure, provided herein is a Smart Wireless Adapter capable of being connected to Pneumatic P/I Converter and Analog measurement devices and configured to wirelessly communicate non-smart measurement devices process variable measurements to various measurement control and data acquisition systems. In another aspect of this disclosure, provided herein is a Smart Wireless Adapter capable of being connected to digital Smart measurement devices and configured to wirelessly communicate process variable measurements and other information (e.g., diagnostic information) to the measurement control and data acquisition systems.

The Smart Wireless Adapters disclosed herein may employ one or more Bluetooth, Zigbee, LoRaWAN, WiFi, RFID and Cellular wireless communication protocols. In accordance with some embodiments of the disclosure, the Smart Wireless Adapters easily mount to the threaded field wiring connection ports of field devices and is wired in parallel with loop powered field terminal connections of various Analog output measurement devices. The Smart Wireless Adapters can include various features such as blinking lights to confirm wireless connection to a Central Concentrator or Gateway, on-board sensors for environmental monitoring, and porting of measurement data via internetworking connectivity to the Cloud enabling data analytics to drive optimized business decisions in synergy with the evolution of Edge Control and Industrial Internet of Things (IIoT).

It is understood that there are many advantages associated with the disclosed systems, methods and devices, as will be appreciated from the discussions below

BRIEF DESCRIPTION OF THE DRAWINGS

The foregoing features of the disclosure, as well as the disclosure itself may be more fully understood from the following detailed description of the drawings, in which.

DETAILED DESCRIPTION

The features and other details of the concepts, systems, and techniques sought to be protected herein will now be more particularly described. It will be understood that any specific embodiments described herein are shown by way of illustration and not as limitations of the disclosure and the concepts described herein. Features of the subject matter described herein can be employed in various embodiments without departing from the scope of the concepts sought to be protected.

Figure 1:
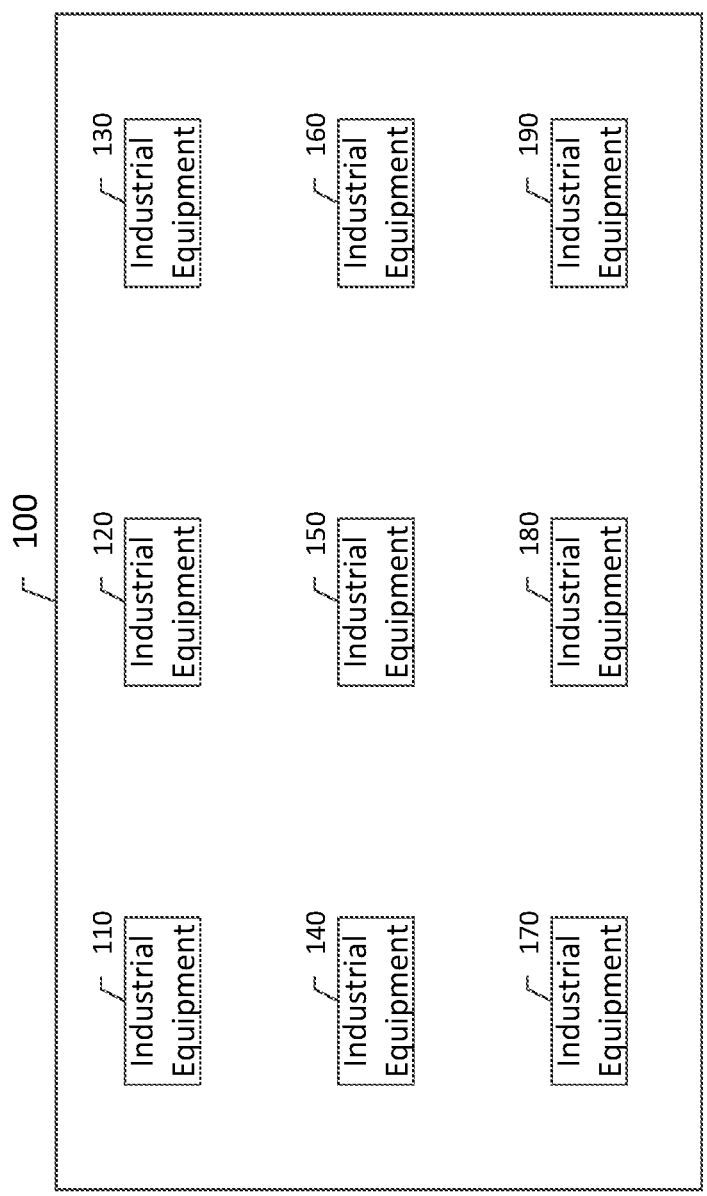
FIG. 1 shows an example industrial system in accordance with embodiments of the disclosure.

Referring to FIG. 1, an industrial system 100 in accordance with embodiments of the disclosure includes a plurality of industrial equipment 110, 120, 130, 140, 150, 160, 170, 180, 190. The industrial equipment (or devices) 110, 120, 130, 140, 150, 160, 170, 180, 190 may be associated with a particular application (e.g., an industrial application), applications, and/or process(es). The industrial equipment 110, 120, 130, 140, 150, 160, 170, 180, 190 may include electrical or electronic equipment, for example, such as machinery (e.g., pumps) in an industrial operation (e.g., a manufacturing or natural resource extraction operation). The industrial equipment 110, 120, 130, 140, 150, 160, 170, 180, 190 may also include the controls and/or ancillary equipment associated with the industrial operation, for example, process control and monitoring measurement devices. In embodiments, the industrial equipment 110, 120, 130, 140, 150, 160, 170, 180, 190 may be installed or located in one or more facilities (i.e., buildings) or other physical locations (i.e., sites) associated with an industrial operation. The facilities may correspond, for example, to industrial buildings. Additionally, the physical locations may correspond, for example, to geographical areas or locations.

Figure 2:
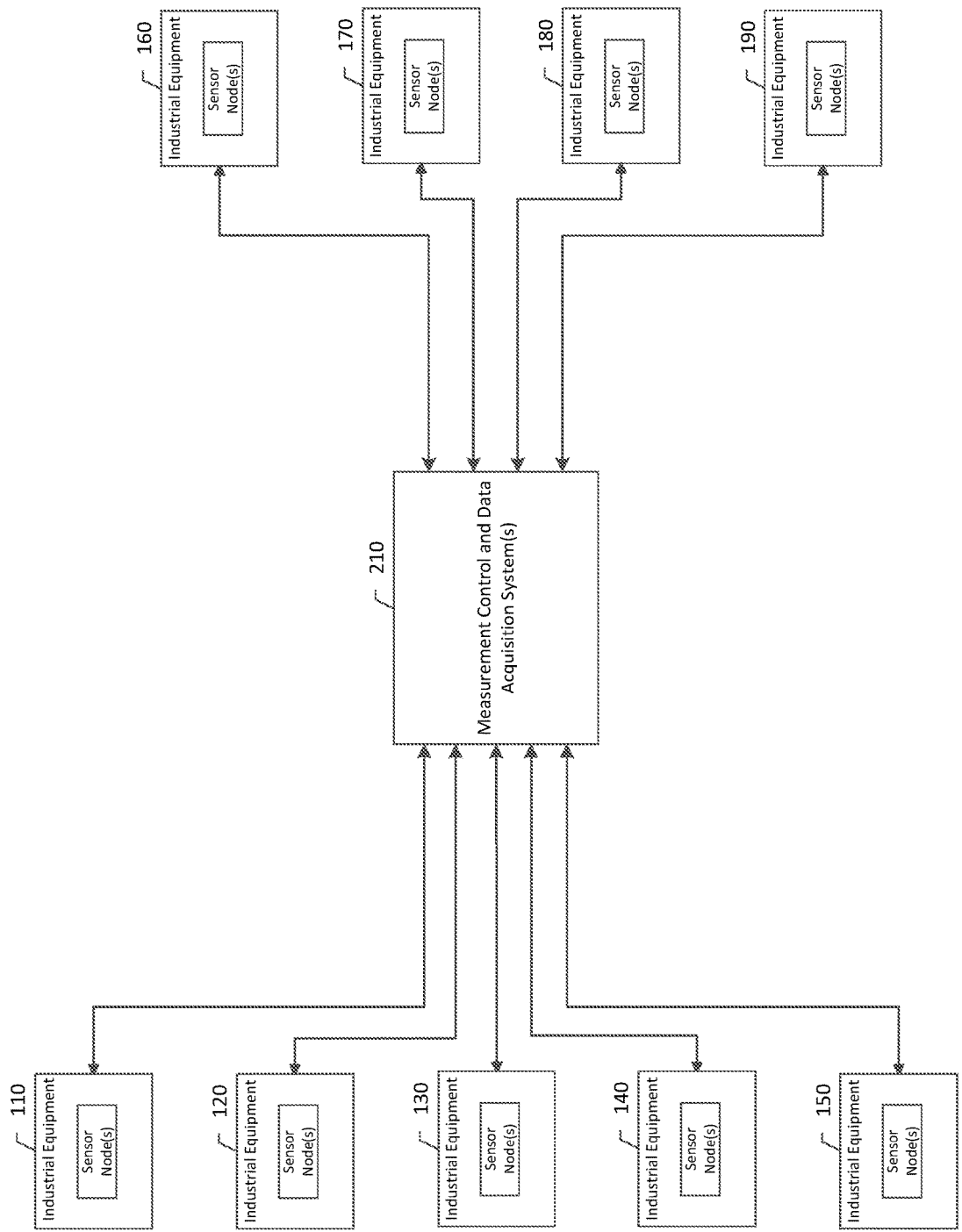
FIG. 2 shows an example configuration of the industrial system shown in FIG. 1.

The industrial equipment 110, 120, 130, 140, 150, 160, 170, 180, 190 may each include or be coupled to one or more sensors (or sensor nodes) in some embodiments, for example, as shown in FIG. 2, as will be discussed further below. Each of the sensors may be configured to sample, sense or monitor one or more parameters (e.g., industrial parameters) associated with the industrial equipment 110, 120, 130, 140, 150, 160, 170, 180, 190 and/or the application(s) or process(es) associated with the industrial equipment 110, 120, 130, 140, 150, 160, 170, 180, 190. For example, industrial equipment 110 may include or be coupled to a temperature sensor configured to sense temperature(s) associated with the industrial equipment 110, for example, ambient temperature proximate to the industrial equipment 110, temperature of a process associated with the industrial equipment 110, temperature of a product produced by the industrial equipment 110, etc. The industrial equipment 110 may additionally or alternatively include one or more pressure sensors, flow sensors, level sensors, vibration sensors and/or any number of other sensors, for example, associated the application(s) or process(es) associated with the industrial equipment 110. The application(s) or process(es) may involve water, air, gas, steam, oil, etc. in one example embodiment.

The industrial equipment 110, 120, 130, 140, 150, 160, 170, 180, 190 may take various forms and may each have an associated complexity (or set of functional capabilities and/or features). For example, industrial equipment 110 may correspond to a "basic" industrial equipment, industrial equipment 120 may correspond to an "intermediate" industrial equipment, and industrial equipment 130 may correspond to an "advanced" industrial equipment. In such embodiments, intermediate industrial equipment 120 may have more functionality (e.g., measurement features and/or capabilities) than basic industrial equipment 110, and advanced industrial equipment 130 may have more functionality and/or features than intermediate industrial equipment 120. For example, in embodiments industrial equipment 110 (e.g., industrial equipment with basic capabilities and/or features) may be capable of monitoring one or more first characteristics of an industrial process, and industrial equipment 130 (e.g., industrial equipment with advanced capabilities) may be capable of monitoring one or more second characteristics of the industrial process, with the second characteristics including the first characteristics and one or more additional parameters. It is understood that this example is for illustrative purposes only, and likewise in some embodiments the industrial equipment 110, 120, 130, etc. may each have independent functionality.

As discussed in the Background section of this disclosure, field devices, which are one type of industrial equipment, have evolved over the years from Pneumatic to Analog to Smart measurement devices. Pneumatic and Analog measurement devices are typically considered as non-smart measurement devices. For example, Pneumatic measurement devices can be coupled with a Pneumatic pressure-to-current converter (P/I converter) to convert a pressure input to a current output measurement. Additionally, Analog measurement devices typically provide for a current or voltage measurement output (e.g., 4-20 mA output). Smart measurement devices, in contrast, typically include digital electronics with various communication protocols such as Modbus, Foundation Fieldbus, Profibus, HART and WirelessHART to digitally communicate process variable measurements to various types of measurement control and data acquisition systems (e.g., supervisory control and data acquisition (SCADA) systems). As discussed in the Background section of this disclosure, there are many industrial operations that still use Pneumatic and/or Analog measurement devices, for example, due to the costs associated with upgrading from Pneumatic and/or Analog measurement devices to corresponding smart devices.

As illustrated in FIG. 2, data from conventional Pneumatic and Analog measurement devices (i.e., non-smart measurement devices, such as 110, 120, 130, etc. shown in FIG. 2) is typically transmitted from these devices to one or more measurement control and data acquisition systems (such as 210 shown in FIG. 2) (for further processing, for example, over one or more wired transmission mediums (e.g., twisted pair cable, coaxial cable, optical fiber cable, etc.). As is known, cabling, for example, can break. Additionally, as is known, it can be cumbersome to route/re-route cabling to/from these devices to measurement control and data acquisition systems.

In one aspect of this disclosure, the present invention seeks to address at least the foregoing issues, for example, by providing a Smart Wireless Adapter for establishing/enabling wireless communication between Pneumatic or Analog measurement devices and measurement control and data acquisition systems in an industrial system. This allows industrial operations to transform their Pneumatic or Analog measurement devices (i.e., non-smart devices) into smart devices, and leverage all of the advantages and benefits associated with smart devices and systems. The invention also provides for integration of these transformed smart devices with other smart devices associated with the industrial operation including, for example, newer smart measurement devices in the industrial operation and wireless sensor network devices such as Instrument Area Network (IAN) devices by Schneider Electric. This invention also provides for Smart Wireless Adapters capable of taking advantage of diagnostic information on digital Smart measurement devices. For example, as previously discussed, a digital Smart measurement device may be utilized only for its digitally converted analog 4-20 mA measurement output, leaving the available device diagnostics stranded or not utilized. It is desirable to take advantage of device diagnostics, for example, to improve operation of the digital Smart measurement device and/or other systems or devices in an industrial system that the diagnostics are capable of capturing.

Figure 3:
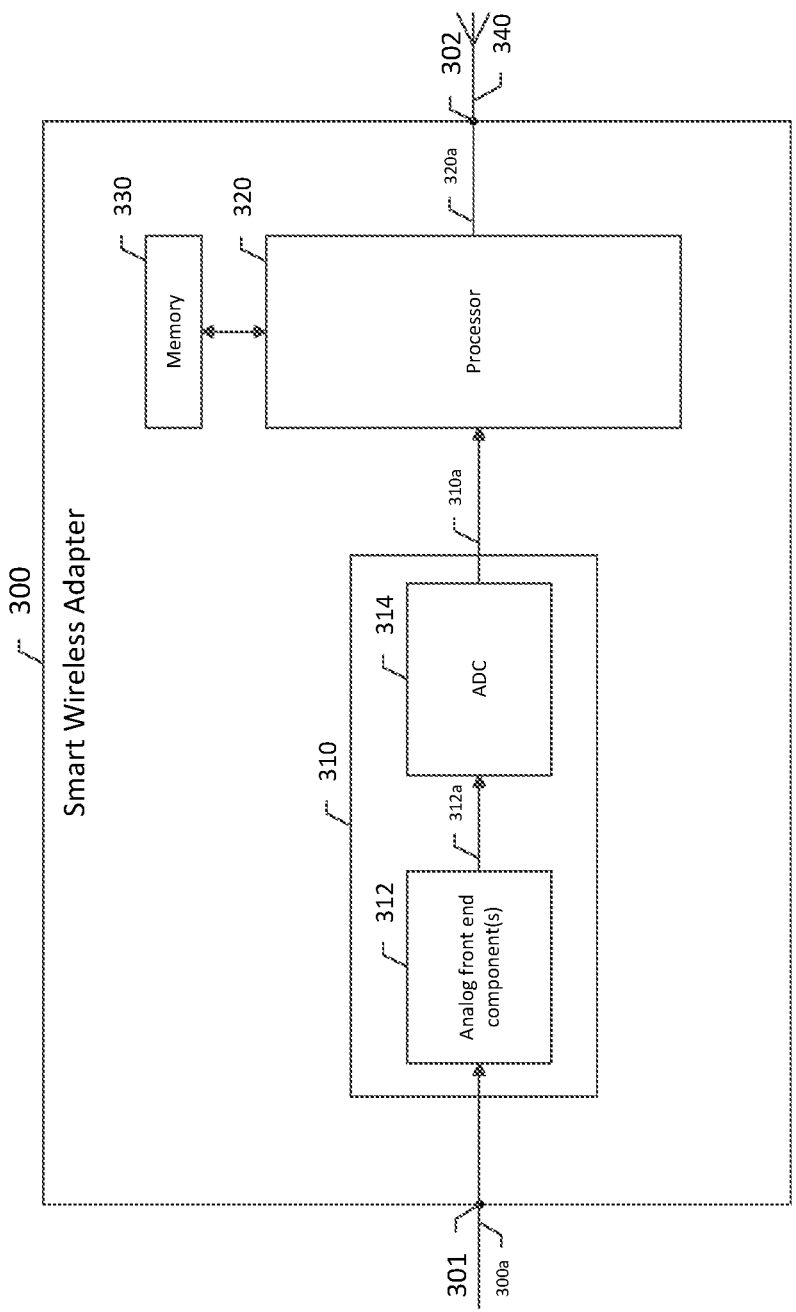
FIG. 3 shows an example Smart Wireless Adapter in accordance with embodiments of the disclosure.

Referring to FIG. 3, an example Smart Wireless Adapter 300 in accordance with one embodiment of the disclosure is shown. In accordance with some embodiments of this disclosure, the Smart Wireless Adapter 300 may be used with industrial equipment, such as Pneumatic and Analog measurement devices, to enable the Pneumatic and/or Analog measurement devices to wirelessly communicate with measurement control and data acquisition systems and/or other devices (e.g., smart measurement devices) in an industrial operation.

In the illustrated embodiment, the Smart Wireless Adapter 300 has at least one input (here, a terminal 301, which may be an input terminal or an input/output (I/O) terminal) and at least one output (here, a terminal 302, which may be an output terminal or an I/O terminal). Additionally, in the illustrated embodiment the Smart Wireless Adapter 300 includes a signal path 310 (e.g., analog, digital and/or mixed signal path), a processor 320, a memory device 330 and an antenna 340 (or other means for wirelessly transmitting data). The signal path 310, which is optional in some embodiments, includes one or more analog front-end components 312 and an analog-to-digital converter (ADC) 314, with the analog front-end components 312 having a first terminal coupled to Smart Wireless Adapter terminal 301 and a second terminal coupled to a first terminal of the ADC 314. Additionally, the ADC 314 has a second terminal coupled to a first terminal of the processor 320, and the processor 320 has a second terminal coupled to measurement circuit terminal 302. The memory device 330 is coupled to a third terminal of the processor 320, and the measurement circuit output 320 is coupled to antenna 340 (or other means for wirelessly transmitting data).

In some embodiments, the Smart Wireless Adapter terminal 301 is coupled (e.g., electrically and mechanically coupled) to an output of industrial equipment (e.g., 110, shown in FIGS. 1 and 1A), such as Pneumatic and/or Analog measurement devices, or other devices for which the Smart Wireless Adapter 300 may be found suitable. Additionally, in some embodiments, the Smart Wireless Adapter terminal 302 is coupled (e.g., communicatively coupled) to an input of measurement control and data acquisition systems and/or other devices (e.g., smart measurement devices) via the antenna 340 (or other means for wirelessly transmitting data). As discussed above with reference to Pneumatic and/or Analog measurement devices, these devices may be configured to sample, sense or monitor one or more parameters associated with the devices and/or the application(s) or process(es) associated with the devices. For example, industrial process control and monitoring measurement devices are typically utilized to measure process variable measurements such as pressure, flow, level, temperature and analytical values in numerous industrial applications and market segments throughout Oil & Gas, Energy, Food & Beverage, Water & Waste Water, Chemical, Petrochemical, Pharmaceutical, Metals, Mining and Minerals and other industry applications.

In accordance with one embodiment of this disclosure, the analog front-end components 312 of signal path 310 include at least one component for measuring/sampling parameters (e.g., voltage, current, etc.) of an input signal (here, input signal 300a). In embodiments, the at least one component may take the form a resistor (e.g., a current sense resistor), a capacitor, and/or substantially any other type of element (or elements) or sensor which may be found suitable for measuring the parameters. It is understood that the quantity of the at least one component (e.g., one element, two elements, three elements, etc.) and arrangement(s) of the at least one component (e.g., serial or parallel coupling) may be selected based, at least in part, on the parameter(s) to be measured by the at least one component. For example, in embodiments in which the at least one component is configured to measure a voltage level of the input signal 300a, for example, to detect a pressure level, the at least one component may include a plurality of measurement elements. The plurality of measurement elements may be coupled in a divider configuration, for example. It is understood that the analog front-end components 312 may additionally or alternatively include one or more other analog components, for example, capacitors, inductors, diodes, transistors, and operational amplifiers. The analog front-end components 312 may take the form of active electrical components and/or passive electrical components.

The processor 320, which may take the form of an FPGA or another type of processor suitable for the application(s) in which the Smart Wireless Adapter 300 is used, is coupled to the signal path 310 (here, to an output of ADC 314 in signal path 310) and to a memory device 330. The memory device 330 may include volatile memory, such as DRAM or SRAM, for example. The memory device 330 may store programs and data collected (e.g., sampled/measured parameters) during operation of the Smart Wireless Adapter 300, for example. The memory device 330 may also include a computer readable and writeable nonvolatile recording medium, such as a disk or flash memory, in which signals are stored that define a program to be executed by the processor 320 or information to be processed by the program. The processor 320 may control transfer of data between the memory device 310 and the processor 320 (e.g., for processing by the processor 320) in accordance with known computing and data transfer mechanisms.

During operation of Smart Wireless Adapter 300, the device 300 is configured to receive an input signal 300a at terminal 301 and to provide an output signal 320a indicative of the input signal 301a at terminal 302. In accordance with some embodiments, the output signal 320a is indicative of a level or value of one or more parameters (e.g., voltage, current, etc.) associated with the input signal 300a. More particularly, in some embodiments the analog front-end components 312 are coupled to the input signal 300a and configured to provide an analog signal 312a (i.e., an initial measurement signal) indicative of a respective one or more of the parameters. In some embodiments, the analog signal 312a is related to a value (e.g., a measured resistance value, or charge) of the analog front-end components 312. Additionally, in some embodiments the analog signal 312a is related to an output of the analog front-end components 312, or to an output of a node proximate to the analog front-end components 312. The analog signal 312a may take the form of a 4-20 mA signal, or be indicative of a 4-20 mA signal, in some embodiments.

The ADC 314 is responsive to the analog signal 312a (e.g., an analog input signal to the ADC) to provide a corresponding converted digital signal 310a at an output of the signal path 310. The digital signal 310a may take the form a digital data stream representative of the analog signal 312a in some embodiments.

The processor 320 is responsive to the digital signal 310a, for example, to generate an output signal 320a at an output of the processor 320. In accordance with some embodiments of this disclosure, the output signal 320a is indicative of the data/signal(s) received at the input of the Smart Wireless Adapter 300. Additionally, in accordance with some embodiments of this disclosure, the output signal 320 may contain other information, such as information relating to process irregularities and other issues identified based on an analysis of the digital signal 310a. The irregularities or issues may be associated with the measurement device coupled to the Smart Wireless Adapter and/or associated with other systems or devices in the industrial system, for example, that the measurement device is configured to monitor.

In accordance with embodiments of this disclosure, the output signal 320a is provided in a form (or forms) suitable for wireless transmission to a recipient device (or devices). For example, the processor 320 may convert the digital signal 310a to a form (or forms) (e.g., code or data stream) suitable for wireless transmission to the recipient device(s). For example, it is understood that the recipient device(s) may have a preferred mode (or modes) of communication (e.g., Bluetooth, Zigbee, LoRaWAN, WiFi, HART protocol, WirelessHART, and Cellular wireless communication protocols). In accordance with some embodiments of this disclosure, the processor 320 may convert the digital signal 310a to a data form (i.e., in output signal 320a) in accordance with the preferred mode(s) of communication.

In accordance with some embodiments of this disclosure, the preferred mode(s) of communication are communicated from the recipient device(s) to the processor 320. In other embodiments, the preferred mode(s) of communication are learned by the processor 320. For example, the processor 320 may learn the preferred mode(s) of communication based on a series of test communications occurring between the Smart Wireless Adapter 300 and the device(s) to which the output signal 320a is to be communicated. In one embodiment, the preferred modes of communication may be identified/learned based on an evaluation of data collected during the series of test communications with respect to information relating to possible modes of communication from a library of possible modes of communication (e.g., stored on memory device 330 or another memory device associated with Smart Wireless Adapter 300). In embodiments in which the preferred modes of communication include a plurality of preferred modes of communication, the Smart Wireless Adapter 300 may select one or more of the plurality of preferred modes of communication to convert the data (e.g., based on transmission capabilities of the Smart Wireless Adapter 300, resources required to transmit the data, etc.).

It is also understood that the preferred modes of communication may be learned or identified in a number of other ways. For example, the Smart Wireless Adapter 300 may identify or learn preferred mode(s) of communication based on the type(s) of data to be transmitted to the recipient device(s). For example, in response to the Smart Wireless Adapter 300 (e.g., processor 320 in Smart Wireless Adapter 300) or the measurement device coupled to the Smart Wireless Adapter 300 detecting or sensing a process measurement irregularity, variance, interruption, etc., the Smart Wireless Adapter 300 may select a different preferred mode (or modes) of communication than if the Smart Wireless Adapter 300 did not detect the process measurement irregularity, variance, interruption, etc. In one example implementation, the Smart Wireless Adapter 300 may select a preferred mode(s) of communication that provides for communication of the detected or sensed process measurement irregularity, variance, interruption, etc. at a higher frequency measurement data rate for systems (e.g., measurement data and control systems) to better analyze the condition (more data than normal operation) and take action (corrective measures with process applications) to optimally maintain process applications. In other words, one type of data (e.g., regular measurement data) may call for a first (or first) preferred mode(s) of communication, and another type of data (e.g., measurement data indicating issues or irregularities) may call for a second (second) preferred mode(s) of communication.

As illustrated in FIG. 3, the output signal 320a from the processor 320 may be provided to terminal 302 of Smart Wireless Adapter 300 (e.g., after selecting the preferred mode(s) of communication) and received by antenna 340 (or other means for wirelessly transmitting data). The antenna 340 may wirelessly transmit the output signal 320a (or a signal indicative of the output signal 320a) to the recipient device(s). For example, the antenna 340 may wirelessly transmit the output signal 320a to measurement control and data acquisition systems and/or other devices in an industrial operation, such as smart measurement devices and wireless sensor network devices (e.g., Instrument Area Network (IAN) devices by Schneider Electric).

Figure 3A:
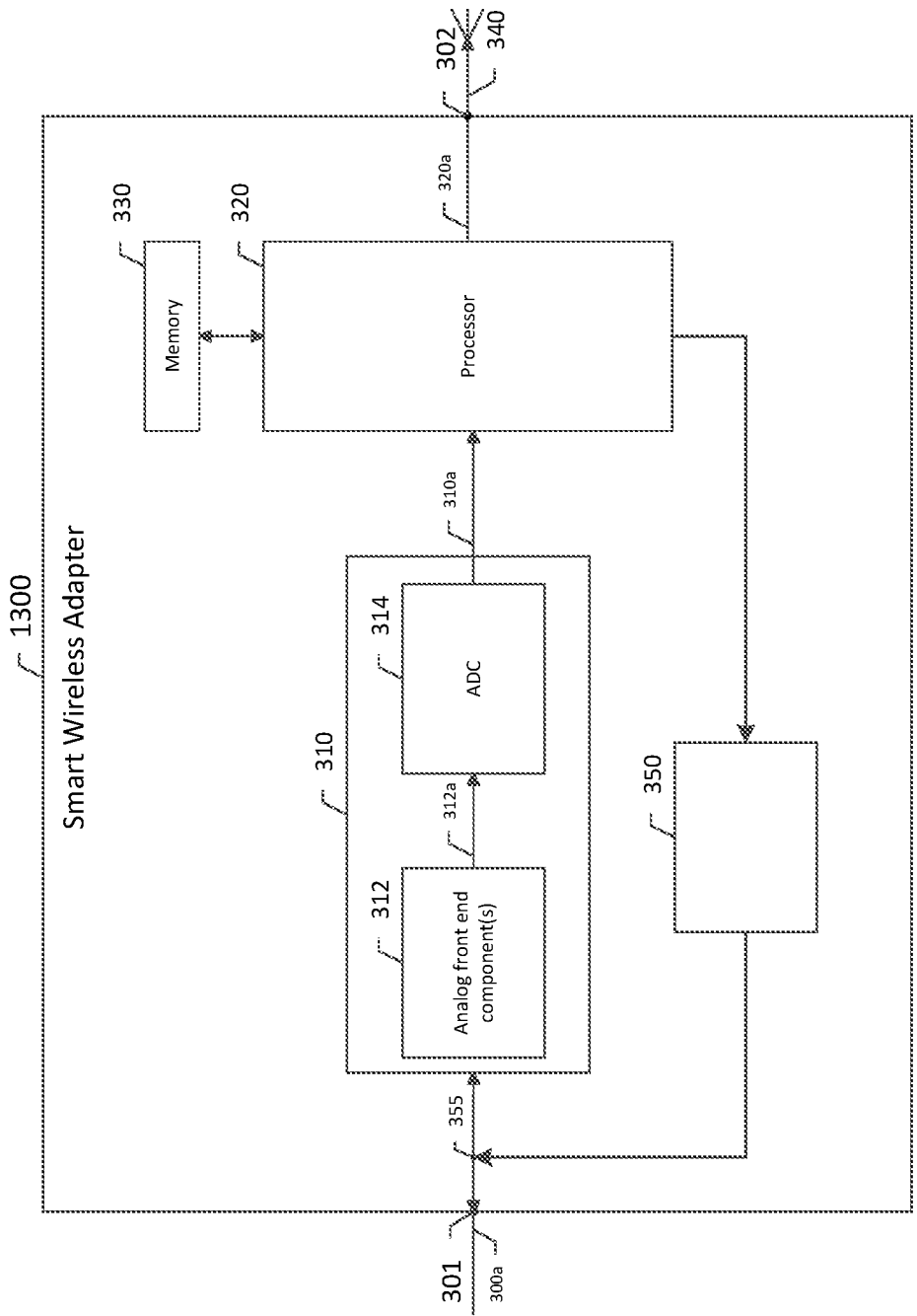
FIG. 3A shows another example Smart Wireless Adapter in accordance with embodiments of the disclosure.

In accordance with some embodiments of this disclosure, the antenna 340 (or another means for wirelessly receiving data) may also receive data from the measurement control and data acquisition systems and/or other devices in the industrial operation, for example, for controlling one or more aspects of the industrial operation, as will be described further below. In other words, Smart Wireless Adapters in accordance with embodiments of this disclosure may provide for bi-directional communication between the device(s) (e.g., measurement device(s)) to which the Smart Wireless Adapters are coupled and the device(s) to which the Smart Wireless Adapters are configured to communicate with (e.g., the measurement control and data acquisition systems and/or other devices in the industrial operation). Referring briefly now to FIG. 3A, in which like elements in FIG. 3 are shown having like reference designations, shown is an example Smart Wireless Adapter 1300 providing for bi-directional communication. It is understood that similar to the data transmitted from the Smart Wireless Adapter 300 to the measurement control and data acquisition systems and/or other devices in the industrial operation discussed above in connection with FIG. 3, the data transmitted from the measurement control and data acquisition systems and/or other devices to the Smart Wireless Adapter 1300 in FIG. 3A may be received in a variety of forms. For example, in accordance with some embodiments of this disclosure, the data may be transmitted to and received by the Smart Wireless Adapter 1300 in accordance with a preferred mode(s) of communication of the transmitting device(s) (i.e., the measurement control and data acquisition systems and/or other devices).

The data received on the Smart Wireless Adapter 1300 may be processed on the Smart Wireless Adapter 1300 (e.g., in processor 320 and/or other devices in the Smart Wireless Adapter 1300, such as in a signal path 350) and/or on other systems and/or devices (e.g., processor of measurement device(s) coupled to the Smart Wireless Adapter 1300). In one example implementation, the Smart Wireless Adapter 1300 may be configured to translate the received data into a form suitable for transmission to the device(s) to which the Smart Wireless Adapter 1300 is coupled (e.g., the measurement device(s)), for example, in embodiments in which the data form(s) in which the data is received is not compatible with the data form(s) the device(s) are capable of receiving/processing. The data may be provided at a node 355 and terminal 301 of Smart Wireless Adapter 1300, and received by the device(s) to which the Smart Wireless Adapter 1300 is coupled. The Smart Wireless Adapter 1300 may additionally or alternatively perform at least some type of filtering of the received data prior to providing the data to the device(s). For example, the Smart Wireless Adapter 1300 may filter unwanted data from the received data prior to providing the data to the device(s) (e.g., using one or more filter devices in signal path 350). Additionally, the Smart Wireless Adapter 1300 may amplify or compress the received data in some embodiments (e.g., using one or more amplification or compression devices in signal path 350). For example, the Smart Wireless Adapter 1300 may amplify or compress the received data to make it suitable for use by the device(s). It is understood that signal path 350 may include any number of devices/components (e.g., digital-to-analog converters, analog-to-digital converters, filters, amplification circuits, etc.) as required for the particular application. It is also understood that the signal path 350 is optional in some embodiments (e.g., unidirectional communication embodiments).

As illustrated above, and as will be described further below, through use of the Smart Wireless Adapters in accordance with embodiments of this disclosure, "non-smart" industrial devices (such as traditional Pneumatic or Analog measurement devices) may be transformed into smart devices and made capable of communicating with measurement control and data acquisition systems and/or other devices in an industrial operation. Additionally, as will be described further below, Smart Wireless Adapters in accordance with embodiments of this disclosure may expand the use of diagnostic information available from measurement devices.

It is understood that Smart Wireless Adapters 300, 1300 are but two of many potential configurations of Smart Wireless Adapters in accordance with embodiments of this disclosure. For example, while the signal path 310 is shown as including analog front-end components 312 and an ADC 314, it is understood that different arrangements of the signal path 310 are possible. For example, the signal path 310 may include additional (or alternative) electrical components in some embodiments, such as operational amplifiers, transistor-based amplification circuits, demodulation circuits, comparators, latches, other means for converting analog signals to digitals signals (e.g., using a slope comparator), etc. It is understood that in some embodiments the processor 320 can perform the function, operation, or sequence of operations of one or more portions of the signal path 310. It is also understood that in some embodiments the memory device 330 may be provided as part of the processor 320 (e.g., as onboard EEPROM). It is further understood that in some embodiments the antenna 340 (or other means for wirelessly transmitting data) may include more than one antenna 340 (or other means for wirelessly transmitting data). Other variations are of course possible.

Figure 3B:
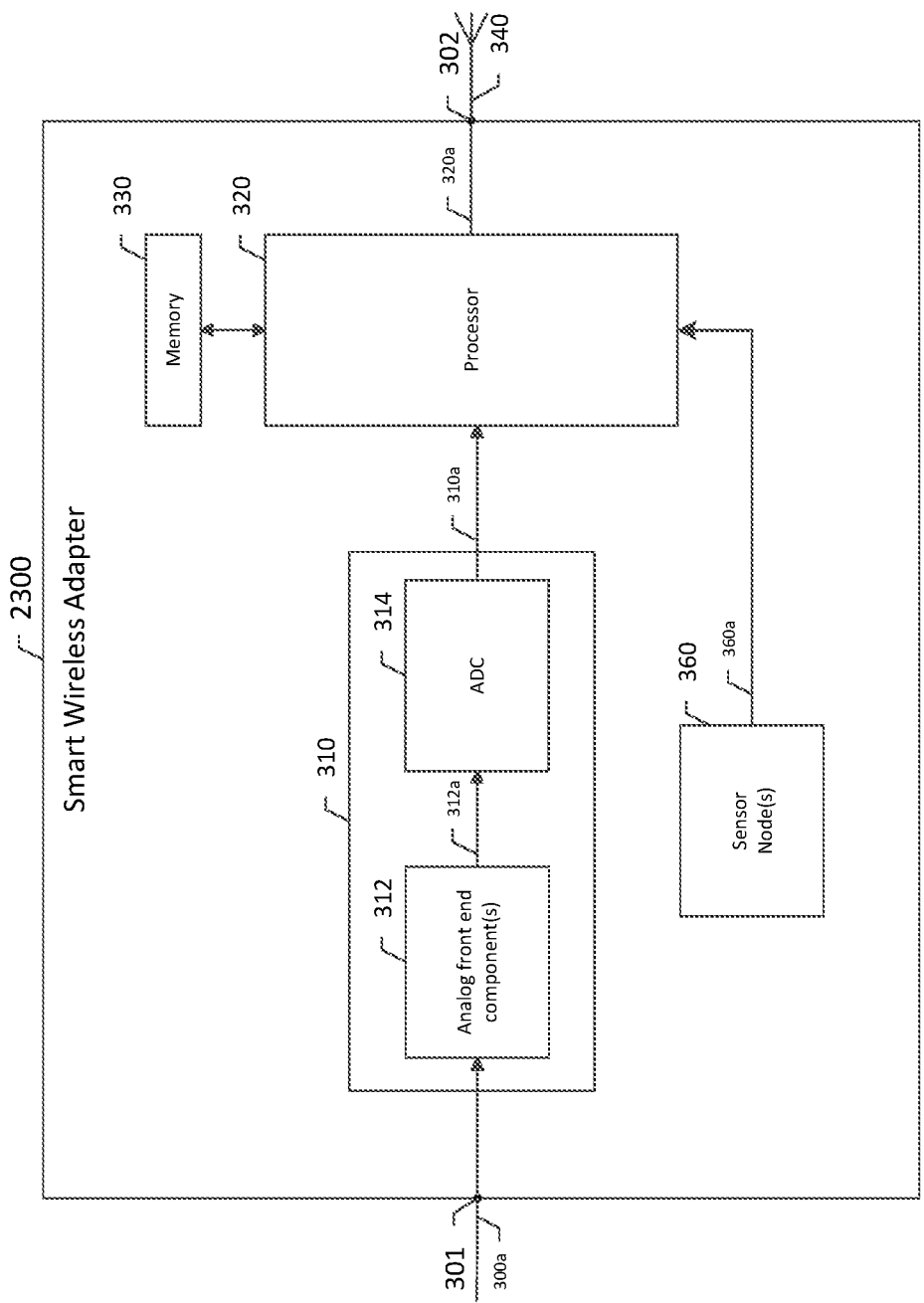
FIG. 3B shows a further example Smart Wireless Adapter in accordance with embodiments of the disclosure.

In one example alternative implementation, a Smart Wireless Adapter in accordance with embodiments of this disclosure may include sensing circuitry, for example, for sensing parameters in addition to the parameters measured by the Pneumatic and/or Analog measurement device(s) to which the Smart Wireless Adapter may be coupled. For example, as illustrated in FIG. 3B, in which like elements in FIG. 3 are shown having like reference designations, a Smart Wireless Adapter 2300 may include one or more sensors (or sensor nodes) 360 for sensing temperature and/or other parameters in embodiments in which the Pneumatic and/or Analog measurement device(s) to which the Smart Wireless Adapter 2300 may be coupled does not measure temperature and/or the other parameters. The sensor(s) 360 may sense/measure temperature and/or the other parameters and generate a signal (or signals) 360a indicative of the measured temperature and/or other parameters.

As illustrated in FIG. 3B, the processor 320 of the Smart Wireless Adapter 2300 may be responsive to the signal(s) 360a from the sensor(s) 360 and to the signal(s) 310a from the signal path 310 to generate the output signal 320a at an output of the processor 320. In accordance with some embodiments of this disclosure, the output signal 320a is indicative of at least one of the signal(s) 360a from the sensor(s) 360 and the data/signal(s) received at the input of the Smart Wireless Adapter 2300. Similar to the embodiment discussed above in connection with FIG. 3, the output signal 320a shown in FIG. 3B may be provided in a form (or forms) suitable for wireless transmission to a recipient device (or devices). It is understood that Smart Wireless Adapter 2300 may provide for bi-directional communication in accordance with some embodiments of this disclosure, similar to the embodiment illustrated in FIG. 3A. Accordingly, it is understood that Smart Wireless Adapter 2300 may include features (e.g., signal path 350) of the Smart Wireless Adapter 1300 shown in FIG. 3A in some embodiments. Additional modifications will be apparent to one of ordinary skill in the art.

Figure 3C:
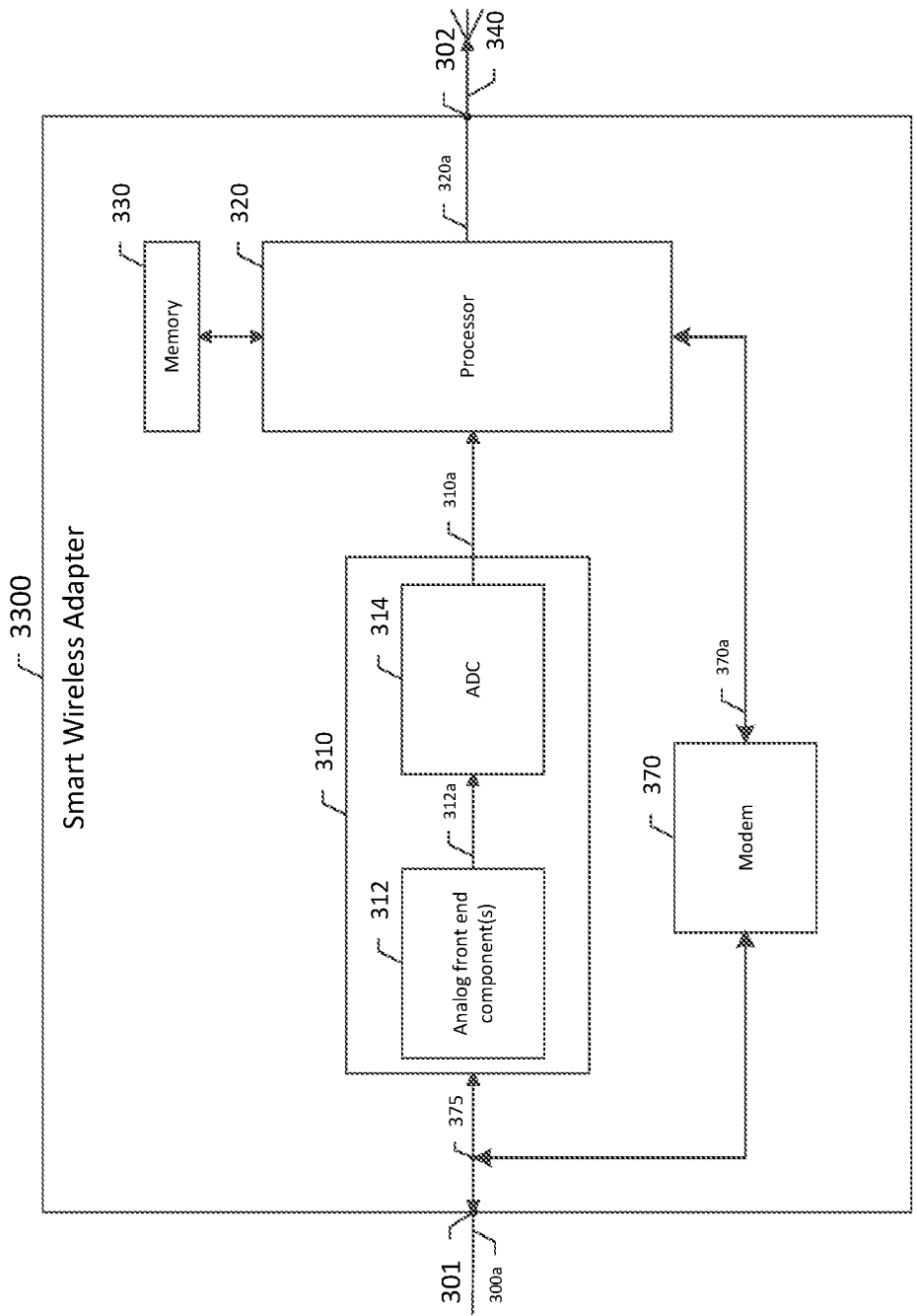
FIG. 3C shows another example Smart Wireless Adapter in accordance with embodiments of the disclosure.

Referring to FIG. 3C, shown is another example Smart Wireless Adapter 3300 in accordance with embodiments of this disclosure. In particular, the Smart Wireless Adapter 3300 is an example implementation of a Smart Wireless Adapter for coupling to a digital Smart measurement device (e.g., Smart HART pressure transmitter). As illustrated in FIG. 3C, in which like elements in FIGS. 3, 3A and 3B are shown having like reference designations, the Smart Wireless Adapter 3300 is shown as additionally including a modem 370. In the illustrated embodiment, the modem 370 (or other means for modulating and demodulating electrical signals) has a first terminal (e.g., first input/output (I/O) port) coupled to a node 375 and a second terminal (e.g., second I/O port) coupled a corresponding terminal on the processor 320. The node 375 is coupled to terminal 301 (e.g., I/O port) of the Smart Wireless Adapter 3300, which may be coupled to a digital Smart measurement device (e.g., via a threading means, or other coupling means, as will be discussed further below).

During operation, the digital Smart measurement device may generate both analog and digital signals (e.g., at an output of the digital Smart measurement device), and the analog and digital signals may be received at the Smart Wireless Adapter terminal 301. In one example implementation, the analog and digital signals are superimposed on the same loop wires, with the loop wires coupled to the Smart Wireless Adapter terminal 301. The analog signal(s) may take the form of an Analog 4-20 mA measurement output signal (or signals), for example. Additionally, the digital signal(s) may take the form of a digital communication protocol output signal (or signals), for example. In accordance with some embodiments of this disclosure, the digital signal(s) may include diagnostic information associated with the digital Smart measurement device and/or other systems or devices associated with the digital Smart measurement device, for example.

Signal path 310 of the Smart Wireless Adapter 3300 is coupled to receive the analog signal(s) at an input and configured to provide a converted digital signal 310a at an output, similar to the embodiment discussed above in connection with FIG. 3, for example. Additionally, the modem 370 (which is protocol(s) specific) is coupled to receive the digital signal(s) at the first modem terminal coupled to node 375, and configured to provide a signal 370a indicative of the digital signal(s) at the second modem terminal coupled to the processor 320.

The processor 320 is responsive to the digital signal 310a and to the signal 370a to generate one or more output signals (here, an output signal 320a) at an output of the processor 320. In accordance with some embodiments of this disclosure, the output signal 320a is indicative of at least one of the digital signal 310a and the signal 370a and is provided in a form (or forms) suitable for wireless transmission to a recipient device (or devices). For example, the processor 320 may convert the digital signal 310a and/or the signal 370a to a form (or forms) (e.g., code or data stream) suitable for wireless transmission to the recipient device(s). For example, as discussed above, it is understood that the recipient device(s) may have a preferred mode (or modes) of communication (e.g., Bluetooth, Zigbee, LoRaWAN, WiFi, HART protocol, WirelessHART, and Cellular wireless communication protocols). In accordance with some embodiments of this disclosure, the processor 320 may convert the digital signal 310a and/or the signal 370a to a data form (i.e., in output signal 320a) in accordance with the preferred mode(s) of communication.

Similar to the embodiment discussed above in connection with FIG. 3A, the Smart Wireless Adapter 3300 shown in FIG. 3C provides for bi-directional communication. For example, the Smart Wireless Adapter 3300 may provide for bi-directional communication between the device(s) (e.g., measurement device(s)) to which the Smart Wireless Adapter 3300 is coupled and the device(s) to which the Smart Wireless Adapter 3300 is configured to communicate with (e.g., the measurement control and data acquisition systems and/or other devices in the industrial operation). In one example implementation, signals/data from the device(s) to which the Smart Wireless Adapter 3300 is configured to communicate with may be received by antenna 340 of Wireless Adapter 3300 and provided to the processor 320. The modem 370 may be coupled to receive signals/data from the processor 320 and configured to transform the received signals/data into a form suitable for understanding by circuitry in the digital Smart measurement device (i.e., the modem 370 provides for bidirectional communication, e.g., HART commands from host system query diagnostics available in the digital Smart measurement device).

It understood that various features from the Smart Wireless Adapters described above may be combined in some embodiments. Thus, unless otherwise stated, features from one of the Smart Wireless Adapters described above may be combined with features of other ones of the Smart Wireless Adapters described above, for example, to capture the various advantages and aspects of Smart Wireless Adapters sought to be protected by this disclosure. For example, it is understood that the embodiments shown in FIGS. 3, 3A and 3C may include sensor(s) similar to the sensor(s) 360 shown in FIG. 3B in some embodiments. Additionally, it is understood that the methods of learning preferred mode(s) of communication discussed in connection with the embodiment shown in FIG. 3 may be employed with the embodiments shown in FIGS. 3A-3C. It is understood that various features from the Smart Wireless Adapters described above may also be separated in some embodiments. It is additionally understood that the embodiments shown in FIGS. 3A-3C are illustrative of three of many possible alternative implementations of Smart Wireless Adapters in accordance with embodiments of this disclosure.

While Smart Wireless Adapters 300, 1300, 2300 and 3300 shown in FIGS. 3-3C are described as producing/receiving a single output signal 320a in the illustrated embodiments, it is understood that the Smart Wireless Adapters 300, 1300, 2300 and 3300 may produce/receive multiple output signals in some embodiments (e.g., when transmitting/receiving output signals to/from more than one device, which may have different preferred mode(s) of communication). Other references to single signals or components are not intended to be limiting and are described as single signals or components for simplicity of discussions herein.

Figure 4:
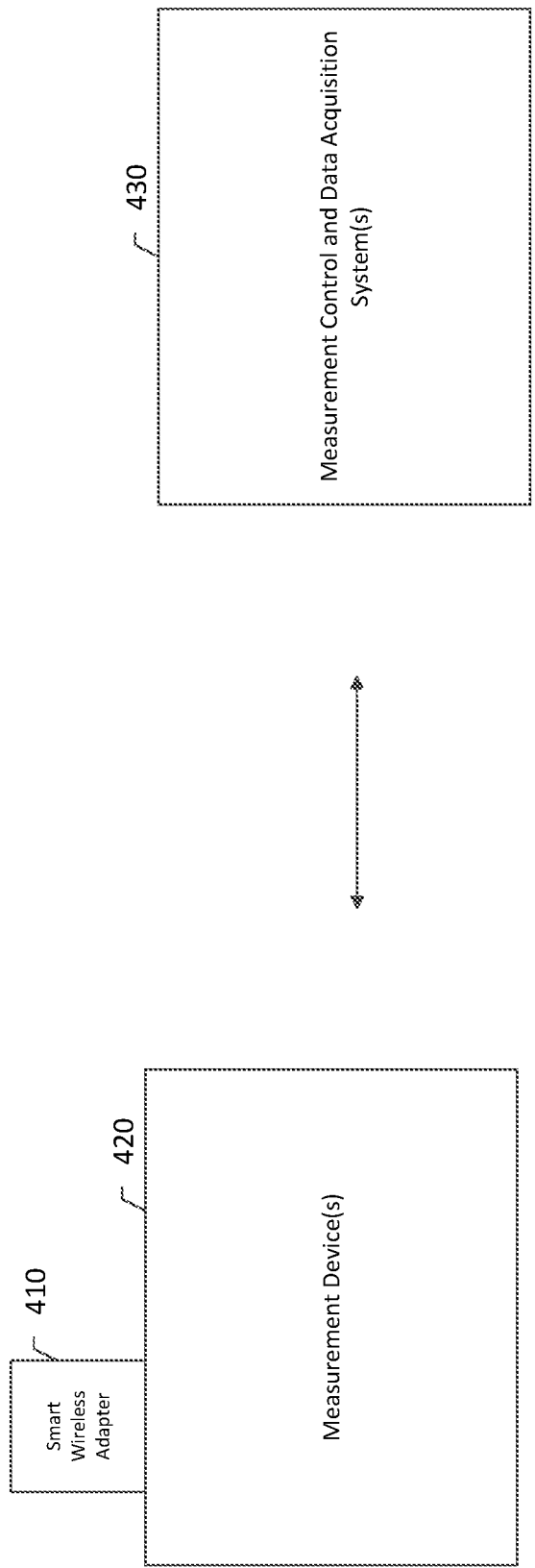
FIG. 4 shows an example configuration of a system including a Smart Wireless Adapter in accordance with embodiments of this disclosure.

Referring to FIG. 4, a Smart Wireless Adapter 410 in accordance with embodiments of the disclosure, which may be the same as or similar to the Smart Wireless Adapters 300, 1300, 2300 and 3300 described above in connection with FIGS. 3-3C, for example, is shown coupled (e.g., electrically and mechanically coupled) to an example measurement device 420 (e.g., a "non-smart" measurement device). The measurement device 420 (e.g., a Pneumatic or Analog measurement device) is configured to measure one or more parameters in an industrial system (e.g., 100, shown in FIG. 1) and provide a value or signal indicative of the measured parameters at an output of the measurement device 420. The Smart Wireless Adapter 410 is coupled to receive the value or signal from the measurement device 420 and configured to wirelessly transmit data indicative of the value or signal to one or more measurement control and data acquisition systems 430 in the illustrated embodiment.

Figure 4A:
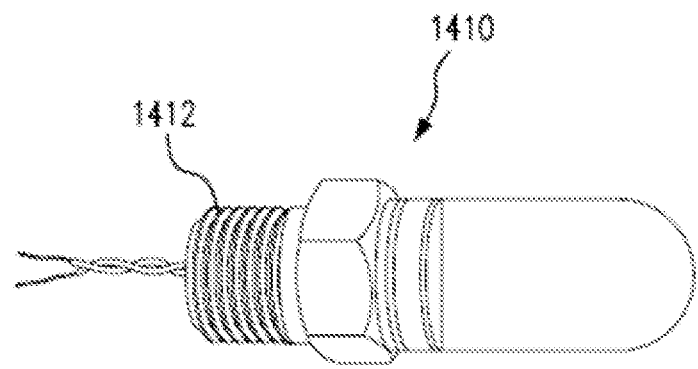
FIG. 4A shows an example Smart Wireless Adapter in accordance with embodiments of the disclosure.
Figure 4B:
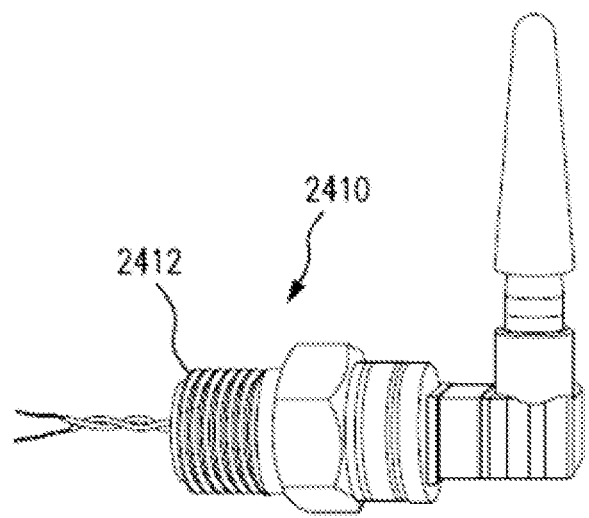
FIG. 4B shows an example Smart Wireless Adapter in accordance with embodiments of the disclosure.

In one example implementation, the Smart Wireless Adapter 410 is capable of being removably coupled to and from the measurement device 420, for example, using a threading means. For example, referring briefly to FIGS. 4A and 4B, Smart Wireless Adapters 1410, 2410 in accordance with embodiments of this disclosure may have respective threaded ends 1412, 2410 (e.g., male threaded rods) that may be received in corresponding openings or receptacles (e.g., female threaded holes) in a measurement device (e.g., 420). Shown in FIG. 4A is an example Smart Wireless Adapter 1410 with a fixed antenna (i.e., an antenna with fixed bandwidth). Additionally, shown in FIG. 4B is an example Smart Wireless Adapter 2410 with an adjustable antenna (i.e., an antenna with adjustable bandwidth).

Figure 4C:
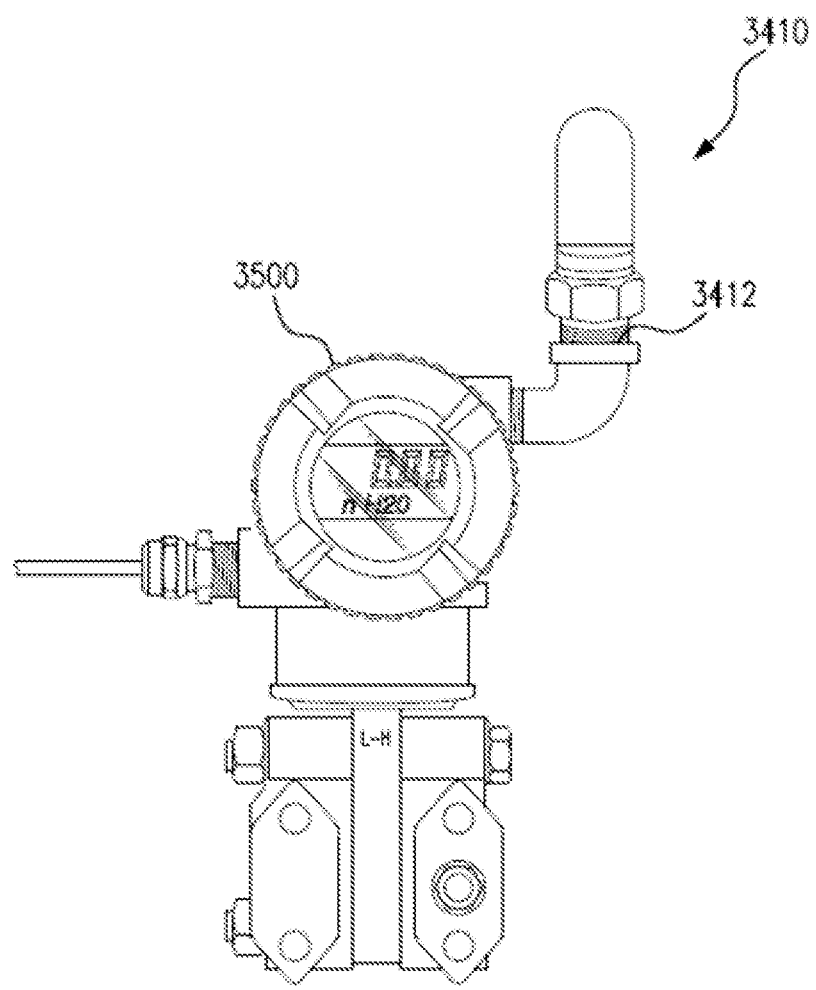
FIG. 4C shows an example Smart Wireless Adapter in accordance with embodiments of this disclosure coupled to an Analog pressure transmitter.

Referring also to FIG. 4C, shown is another example Smart Wireless Adapter 3410 coupled to an Analog Pressure Transmitter 3500 (which is an example measurement device) via a threading means 3412. In accordance with embodiments of the disclosure, the Smart Wireless Adapter 3410 may enable the Analog Pressure Transmitter 3500 to wirelessly communicate with measurement control and data acquisition systems (e.g., 430, shown in FIG. 4, as will be discussed further below) and other wireless devices in an industrial system.

It is understood that other mechanical means for coupling Smart Wireless Adapters (e.g., 1410, 2410, 3410) to devices, besides a threading means or other rotatable structure, are of course possible. For example, a socket type connection may be desirable in some embodiments. In one example implementation, the socket type connection may take the form of a quick connect socket having a body (socket or female end) and a plug (or male end). The body may be provided on or integrated into the Smart Wireless Adapter in some embodiments, and provided on or integrated into the device(s) in other embodiments. A clamping structure may be desirable in other embodiments. The clamping structure may comprise a tightening mechanism (e.g., a screw) for coupling the Smart Wireless Adapter to the device(s). For example, the Smart Wireless Adapter may be coupled to the device(s) using the clamping structure in response to one or more forms of motion (e.g., turns of the screw) being performed using the tightening mechanism. Other attachment mechanisms, and other ways of coupling (e.g., by rotation in clockwise or counterclockwise direction(s), push-pull force (s), etc.), besides the examples discussed above are also possible, as will be apparent to one of ordinary skill in the art.

It is understood that Smart Wireless Adapters may be fabricated using a variety of materials and processes, as will be apparent to one of ordinary skill in the art. For example, the Smart Wireless Adapters may be fabricated using one or more metals, plastics, ceramics, composites, rubber materials, etc., for example, depending on the application(s) and environment(s) in which the Smart Wireless Adapters are being used. It is also understood that the Smart Wireless Adapters may be flexible or rigid, for example, depending on the application(s) and environment(s) in which the Smart Wireless Adapters are being used. For example, it may be desirable for an antenna (and other portions) of a Smart Wireless Adapter to be flexible in some instances (e.g., due to lighter weight, potentially lower costs of manufacturing such as made possible by 3D printing, ease of fabrication, and availability of inexpensive flexible substrates such as plastics).

Figure 4D:
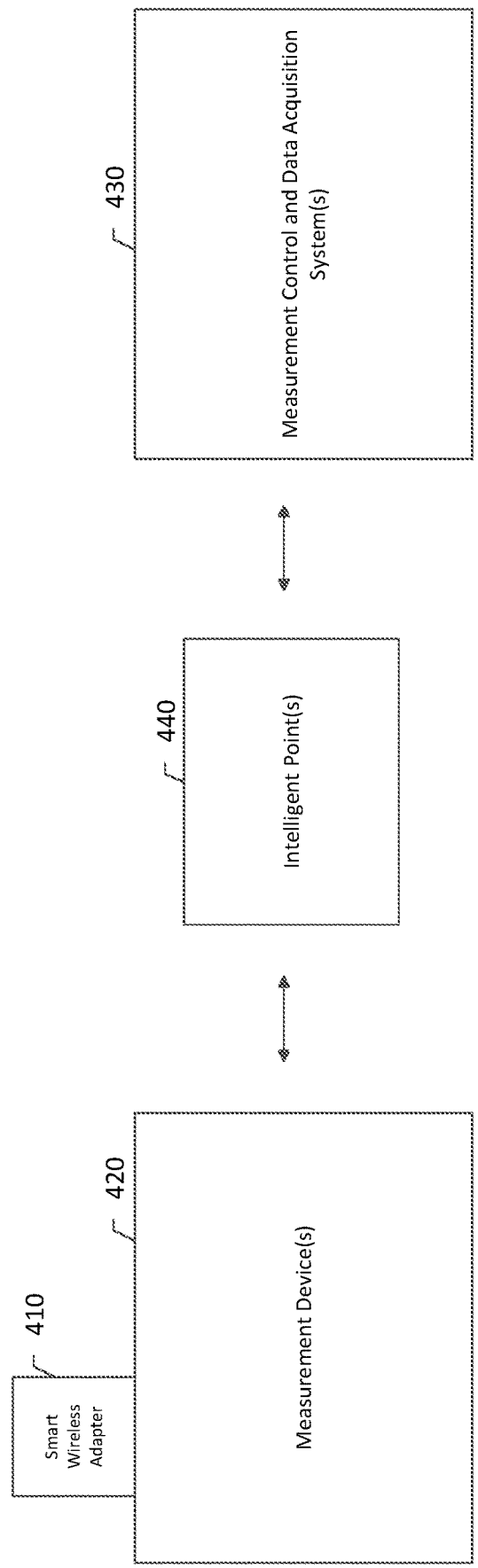
FIG. 4D shows an example configuration of a system including a Smart Wireless Adapter in accordance with embodiments of this disclosure.

Returning now to FIG. 4, in accordance with some embodiments of this disclosure, the measurement device 420 shown in FIG. 4 may be directly communicatively coupled to the measurement control and data acquisition system(s) 430 using the Smart Wireless Adapter 410. In other embodiments, the measurement device 420 may be indirectly communicatively coupled to the measurement control and data acquisition system(s) 430 using the Smart Wireless Adapter 410. For example, in some embodiments the measurement device 420 may be communicatively coupled to the measurement control and data acquisition system(s) 430 through an intermediate device, such as an intelligent point 440 (e.g., computing devices with one or more processors and memory devices), as shown in FIG. 4D, for example. The intelligent point 440 may, for example, pre-process data collected by the measurement device 420 before the data is received by the measurement control and data acquisition system(s) 430. For example, the intelligent point 440 may determine one or more computed values, such as duration(s), average value(s), maximum value(s), minimum value(s), etc., and provide the computed values to the measurement control and data acquisition system(s) 430.

One example of an intelligent point is an Instrument Area Network (IAN) device by Schneider Electric. In embodiments in which the IAN device is used, for example, the measurement device 420 may transmit data (e.g., measurement data) to the IAN device via the Smart Wireless Adapter 410 using a first mode (or modes) of communication, and the IAN device may transmit data (e.g., data indicative of the measurement data) to the measurement control and acquisition system(s) 430 using a second mode (or modes) of communication. In one example implementation, the first mode(s) of communication include(s) or corresponds to Bluetooth communication (e.g., ultra-low-power BLE (Bluetooth Low Energy)) and the second mode(s) of communication include(s) or corresponds to Cellular wireless communication. It is understood that the first and second modes of communication may be the same in some embodiments, and different in other embodiments. It is also understood that other types of intelligent points besides IAN devices, such as Gateways, may be used to communicatively couple the measurement device 420 to the measurement control and data acquisition system(s) 430.

Figure 4E:
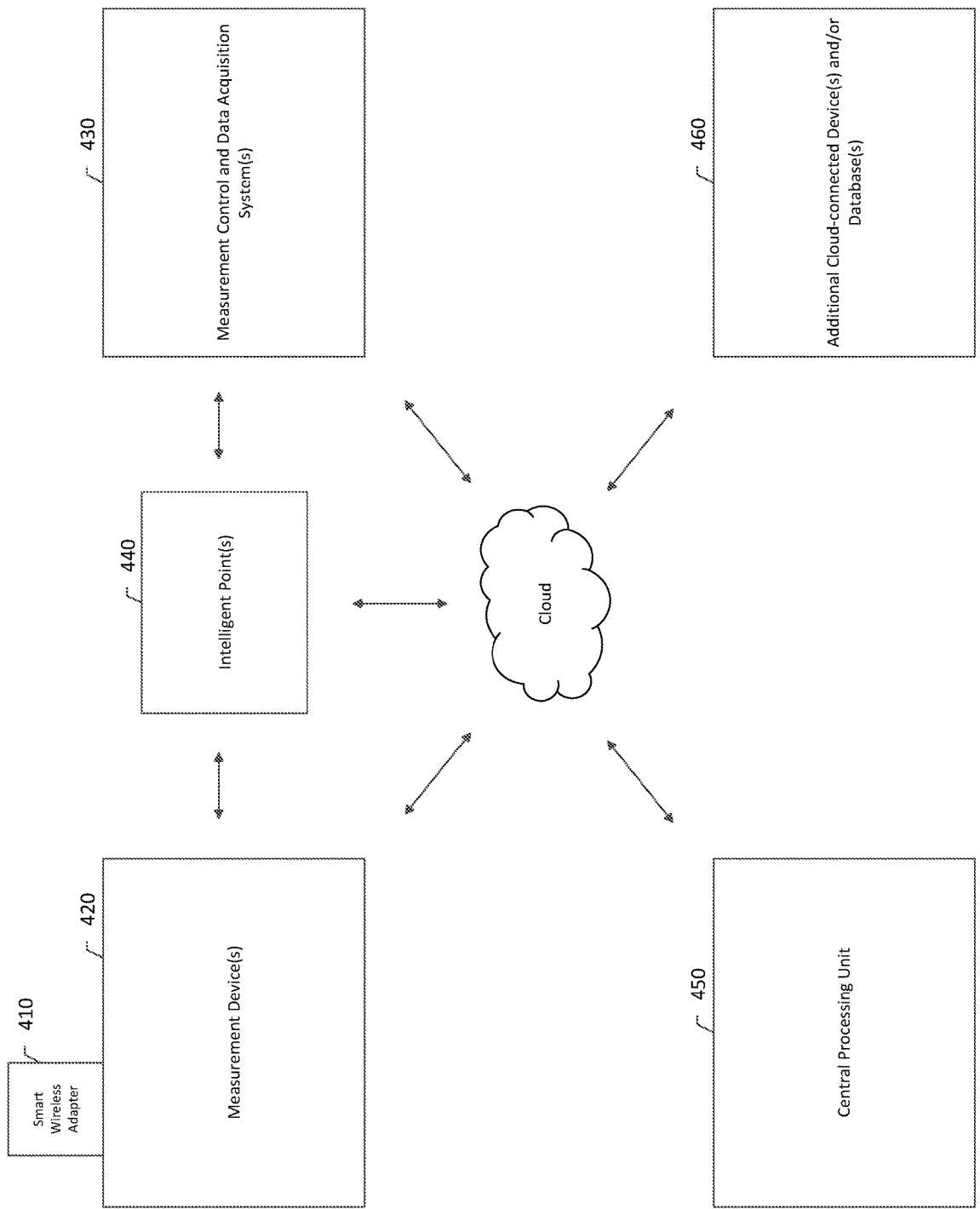
FIG. 4E shows another example configuration of a system including a Smart Wireless Adapter in accordance with embodiments of this disclosure.

In accordance with some embodiments of this disclosure, the measurement device 420 may also be communicatively coupled to one or more cloud computing systems or devices using the Smart Wireless Adapter 410, for example, as shown in FIG. 4E. As illustrated in FIG. 4E, the measurement device 420 may be directly coupled to the one or more cloud computing systems or devices in some embodiments, and indirectly coupled (e.g., via intelligent point(s) 440) in other embodiments. As used herein, the terms "cloud" and "cloud computing" are intended to refer to computing resources connected to the Internet or otherwise accessible to the measurement device 420 via a communication network, which may be a wired or wireless network, or a combination of both. The computing resources comprising the cloud may be centralized in a single location, distributed throughout multiple locations, or a combination of both. A cloud computing system may divide computing tasks amongst multiple racks, blades, processors, cores, controllers, nodes or other computational units in accordance with a particular cloud system architecture or programming. Similarly, a cloud computing system may store instructions and computational information in a centralized memory or storage, or may distribute such information amongst multiple storage or memory components. The cloud system may store multiple copies of instructions and computational information in redundant storage units, such as a RAID array.

A central processing unit 450 may be an example of a cloud computing system, or cloud-connected computing system. In embodiments, the central processing unit 450 may be a server located within buildings in which industrial equipment (e.g., measurement device 420) are provided, or may be a remotely located cloud-based service. The central processing unit 450 can be configured to implement a variety of analysis techniques to identify patterns in data received from the measurement device 420, for example. The various analysis techniques may further involve the execution of one or more software functions, algorithms, instructions, applications, and parameters, which are stored on one or more sources of memory communicatively coupled to the central processing unit. In certain embodiments, the terms "function", "algorithm", "instruction", "application", or "parameter" may also refer to a hierarchy of functions, algorithms, instructions, applications, or parameters, respectively, operating in parallel and/or tandem. A hierarchy may comprise a tree-based hierarchy, such a binary tree, a tree having one or more child nodes descending from each parent node, or combinations thereof, wherein each node represents a specific function, algorithm, instruction, application, or parameter.

In accordance with some embodiments of this disclosure, the central processing unit 450 may correspond to a central processing unit associated with a diagnostic computing device or system (hereinafter, collectively referred to as a diagnostic computing device for simplicity). In these embodiments, the diagnostic computing device may be configured to process the data (e.g., measurement information, diagnostic codes, etc.) received from the measurement device 420 to identify issues associated with the measurement device 420 and/or other systems and/or devices associated with the industrial system including the measurement device 420, for example. The issues may be identified, for example, using a variety of analysis techniques. In embodiments in which the diagnostic computing device is connected to the cloud, for example, it may access additional cloud-connected devices or databases 460 via the cloud to use in the analysis. For example, the diagnostic computing device may access historical measurement data previously received from the measurement device 420, historical event and/or alarm data, or other data that may be useful in analyzing current data received from the measurement device 420. The cloud-connected devices or databases 460 from which the data is accessed may correspond to a device or database associated with one or more external data sources, for example.

In embodiments, by leveraging the cloud-connectivity and enhanced computing resources of the diagnostic computing device relative to the measurement device 420, sophisticated analysis can be performed on data received from the measurement device 420, as well as on additional sources of data that may be received (e.g., from the above-discussed cloud-connected devices or databases 460), when appropriate. This analysis can be used to dynamically control one or more parameters, processes, conditions or devices (e.g., switches) associated with the industrial system including the measurement device 420, for example. In embodiments, the parameters, processes, conditions or equipment are dynamically controlled by one or more control devices. The control devices may correspond, for example, to control devices in or associated with the measurement control and data acquisition systems 430.

In embodiments in which the control devices correspond to control devices in measurement control and data acquisition systems 430, for example, the measurement control and data acquisition systems 430 may receive one or more control signals from the diagnostic computing device (e.g., 450) in response to data analysis performed on the diagnostic computing device. The control signals may, in turn, be used by the control devices in the measurement control and data acquisition systems 430 to control the one or more parameters, processes, conditions or devices associated with the industrial system.

In embodiments in which the control devices correspond to control devices associated with measurement control and data acquisition systems 430, the control devices may be coupled to receive control signals generated by the measurement control and data acquisition systems 430 and/or other systems and/or devices (e.g., the diagnostic computing device). The control signals may, in turn, be used by the control devices to control the one or more parameters, processes, conditions or devices associated with the industrial system. The control devices may be coupled to the measurement control and data acquisition systems 430 and to the systems and/or devices for which the parameters, processes, conditions are to be controlled, for example. It is understood by one or ordinary skill in the art that control devices, such as the above-discussed control devices, may take a variety of forms. Additionally, it is understood that a variety of devices may implement control functionality.

In accordance with further embodiments of this disclosure, the analysis performed on the data received from the measurement device 420 may also be used (e.g., by the above-discussed diagnostic computing device) to generate alarms and/or other alerts indicating issues, status information, etc. associated with associated with the measurement device 420 and/or other systems and/or devices associated with the industrial system including the measurement device 420. The alarms and/or other alerts (which may contain detailed information associated with issues, etc.) may be presented on a display device, for example. The display device may correspond to a display device of a computing device (e.g., mobile phone, tablet, etc.) used by a services personnel or system monitor, for example. In accordance with some embodiments of this disclosure, the alarms and/or other alerts may be prioritized (e.g., by the diagnostic computing system) based on a number of factors (e.g., issue type, severity, location, etc.) and presented on the display device based on the prioritization. It is understood that prioritization is but one of many potential ways of organizing the alarms and/or other alerts. Additionally, it is understood that the example implementations discussed above are merely example implementations and many other additional and alternative implementations are of course possible.

Figure 5A:
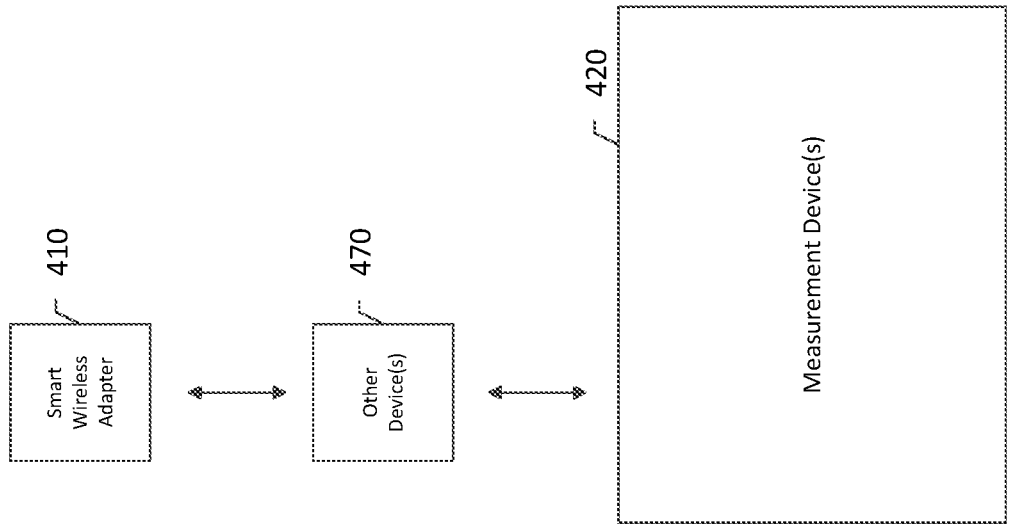
FIG. 5A shows an example coupling arrangement of the configuration shown in FIG. 5.
Figure 5:
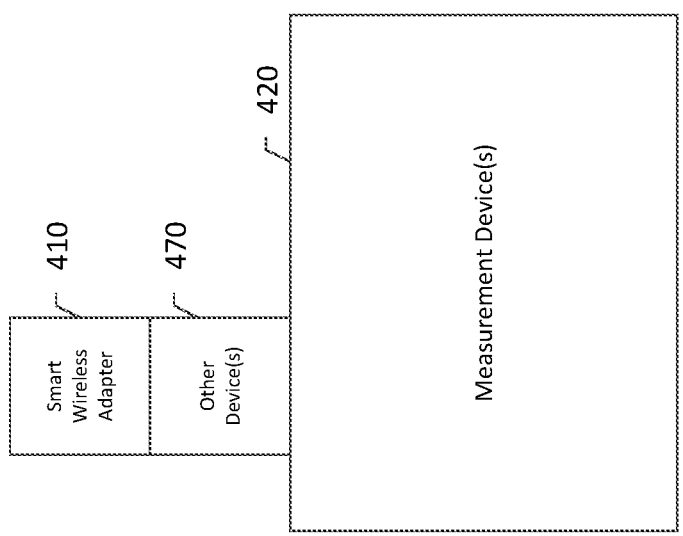
FIG. 5 shows an example configuration of a measurement device utilizing a Smart Wireless Adapter in accordance with embodiments of this disclosure.

Referring to FIG. 5, shown is another example configuration of a measurement device 420 utilizing a Smart Wireless Adapter 410 in accordance with embodiments of this disclosure. As illustrated in FIG. 5, in one example implementation of the invention, the Smart Wireless Adapter 410 may be coupled to the measurement device 420 via one or more other devices 470. In accordance with some embodiments of this disclosure, the one or more other devices 470 may include or correspond to a sensing device (or sensing devices) capable of adding a sensing ability (or sensing abilities) to the measurement device 420 that was/ were not already present in the measurement device 420. For example, in embodiments in which the measurement device 420 does not have temperature sensing capabilities, the other devices 470 may include or correspond to a temperature sensor and be capable of adding temperature sensing capabilities to the measurement device 420. Additionally, in embodiments in which the measurement device 420 has limited temperature sensing capabilities, the other devices 470 may add enhancements to the temperature sensing capabilities (e.g., allow for more accurate temperature sensing, and/or sensing of additional or different temperature parameters).

It is understood that the other devices 470 may be provided as or include other sensing devices besides temperature sensing devices, such as vibration sensors and/or any number of other sensors associated with the application(s) or process(es) associated with the measurement device 420. Additionally, it is understood that the other devices 470 may be provided as or include other devices besides sensing devices. For example, the other devices 470 may be provided as or include a device or devices to extend the range of the Smart Wireless Adapter 410. It is understood that any number of other configurations of the other devices 470 are of course possible, as will be apparent to one of ordinary skill in the art. In general, the other devices 470 may provide expanded functionality to the measurement device 420 and/or to the Smart Wireless Adapter 410.

In accordance with some embodiments of this disclosure, the other devices 470 may be removably coupled to the measurement device 420, and the Smart Wireless Adapter 410 may be removably coupled to the measurement device 420, as illustrated by FIG. 5A. For example, similar to the Smart Wireless Adapter embodiments discussed above, in one example implementation the other devices 470 may be threaded onto a corresponding portion on the measurement device 420 using a threading means, and the Smart Wireless Adapter 410 may be threaded onto a corresponding portion on the other devices 470 using a threading means. Additionally, in one example implementation, the other devices 470 may be coupled to a corresponding portion on the measurement device 420 via a socket type connection, and the smart wireless adapter 410 may be threaded onto a corresponding portion on the other devices 470 via a socket type connection. It is understood that there are many other possible means for coupling the other devices 470 to the measurement device 420, and for coupling the Smart Wireless Adapter 410 to the measurement device 420. In accordance with some embodiments of this disclosure, the means for coupling is selected based on the application, cost, strength of connection, ability of the other devices 470, the measurement device 420 and the Smart Wireless Adapter 410 to be quickly coupled and decoupled to each other, etc.

As illustrated by the various embodiments discussed above, there are many possible configurations of and uses for Smart Wireless Adapters in accordance with embodiments of this disclosure.

As described above and as will be appreciated by those of ordinary skill in the art, embodiments of the disclosure herein may be configured as a system, method, or combination thereof. Accordingly, embodiments of the present disclosure may be comprised of various means including hardware, software, firmware or any combination thereof.

It is to be appreciated that the concepts, systems, circuits and techniques sought to be protected herein are not limited to use in the example applications described herein (e.g., industrial applications) but rather, may be useful in substantially any application where it is desired to automatically collect and analyze data from device or equipment.

Having described preferred embodiments, which serve to illustrate various concepts, structures and techniques that are the subject of this patent, it will now become apparent to those of ordinary skill in the art that other embodiments incorporating these concepts, structures and techniques may be used. Additionally, elements of different embodiments described herein may be combined to form other embodiments not specifically set forth above Accordingly, it is submitted that that scope of the patent should not be limited to the described embodiments but rather should be limited only by the spirit and scope of the following claims.

What is claimed is:

1. A method of establishing communication between a Pneumatic or Analog measurement device and a measurement control and data acquisition system in an industrial system, the method comprising:
providing a Pneumatic or Analog measurement device, the Pneumatic or Analog measurement device configured to measure one or more parameters in the industrial system and provide a value or signal indicative of the measured parameters at an output of the Pneumatic or Analog measurement device; and
providing a Smart Wireless Adapter capable of electrically and mechanically coupling to the Pneumatic or Analog measurement device, the Smart Wireless Adapter coupled to receive the value or signal from the Pneumatic or Analog measurement device and configured to wirelessly transmit data indicative of the value or signal to the measurement control and data acquisition system;
wherein the data indicative of the value or signal is converted into a data form in accordance with one or more preferred modes of communication of the measurement control and data acquisition system, the one or more preferred modes of communication including one or more wireless communication protocols;
wherein at least a portion of the preferred modes of communication are communicated from the measurement control and data acquisition system to the Smart Wireless Adapter; and
wherein the preferred modes of communication include a plurality of preferred modes of communication, the Smart Wireless Adapter converting a digital signal associated with the value or signal from the Pneumatic or Analog measurement device based at least in part upon the one or more preferred modes of communication, and further wherein the wirelessly transmitted data indicative of the value or signal includes the converted digital signal.

2. The method of claim 1, wherein the Smart Wireless Adapter is capable of being removably coupled to and from the Pneumatic or Analog measurement device.

3. The method of claim 1, wherein the Smart Wireless Adapter is capable of being removably coupled to and from the Pneumatic or Analog measurement device using a threading means.

4. The method of claim 1, wherein the Smart Wireless Adapter is received in a socket or opening formed in the Pneumatic or Analog measurement device.

5. The method of claim 1, wherein the Smart Wireless Adapter selects one or more of the plurality of preferred modes of communication, and the data indicative of the value or signal is converted into the data form based on the selected modes of communication.

6. The method of claim 1, wherein one or more of the preferred modes of communication are learned by the Smart Wireless Adapter.

7. The method of claim 6, wherein the one or more of the preferred modes of communication are learned based on a series of test communications occurring between the Smart Wireless Adapter and the measurement control and data acquisition system.

8. The method of claim 7, further comprising: identifying the one or more of the preferred modes of communication based on an evaluation of data collected during the series of test communications with respect to information relating to possible modes of communication from a library of possible modes of communication.

9. The method of claim 1, wherein the data form is further selected from a variety of data forms that the Smart Wireless Adapter is capable of generating and transmitting.

10. The method of claim 9, wherein the variety of data forms include data forms suitable for transmission using one or more of Bluetooth, Zigbee, LoRaWAN, WiFi, WirelessHART, RFID and Cellular wireless communication protocols.

11. The method of claim 1, further comprising:
receiving signals/data from the measurement control and data acquisition system on the Smart Wireless Adapter in a first data form, and
providing data indicative of the received signals/data to the Pneumatic or Analog measurement device in a second data form.

12. The method of claim 11, wherein the first data form is a form suitable for interpretation by the Smart Wireless Adapter, and the second data form is a form suitable for interpretation by the Pneumatic or Analog measurement device.

13. The method of claim 12, wherein the first data form and the second data form are different data forms.

14. The method of claim 11, wherein the signal/data received from the measurement control and data acquisition system are used to control one or more aspects of the Pneumatic or Analog measurement device and/or to control one or more aspects of systems or devices associated with the Pneumatic or Analog measurement device.

15. A Smart Wireless Adapter for establishing communication between a Pneumatic or Analog measurement device and a measurement control and data acquisition system in an industrial system, the Smart Wireless Adapter comprising:
at least one processor;
at least one memory device coupled to the at least one processor, the at least one processor and the at least one memory device configured to:
receive a value or signal indicative of one or more parameters measured by the Pneumatic or Analog measurement device; and
wirelessly transmit data indicative of the value or signal to the measurement control and data acquisition system;
wherein the data indicative of the value or signal is converted into a data form in accordance with one or more preferred modes of communication of the measurement control and data acquisition system, the one or more preferred modes of communication including one or more wireless communication protocols;
wherein the preferred modes of communication are communicated from the measurement control and data acquisition system to the Smart Wireless Adapter; and
wherein the preferred modes of communication include a plurality of preferred modes of communication, the at least one processor being configured to convert a digital signal associated with the value or signal from the Pneumatic or Analog measurement device based at least in part upon the one or more preferred modes of communication, and further wherein the data indicative of the value or signal is configured to include the converted digital signal.

16. The Smart Wireless Adapter of claim 15, wherein the Smart Wireless Adapter includes a threaded portion capable of being received onto a corresponding portion of the Pneumatic or Analog measurement device.

17. The Smart Wireless Adapter of claim 15, wherein the at least one processor and the at least one memory device are further configured to:
  prior to wirelessly transmitting the data indicative of the value or signal to the measurement control and data acquisition system, convert the value or signal indicative of the measured parameters to a data form suitable for transmission to and receipt by the measurement control and data acquisition system.

18. The Smart Wireless Adapter of claim 17, wherein the data form suitable for transmission to and receipt by the measurement control and data acquisition system is a data form in accordance with one or more preferred modes of communication of the measurement control and data acquisition system.

19. The Smart Wireless Adapter of claim 17, wherein the data form is selected from a variety of data forms that the Smart Wireless Adapter is capable of generating and transmitting.

20. The Smart Wireless Adapter of claim 19, wherein the variety of data forms include data forms suitable for transmission using one or more of Bluetooth, Zigbee, LoRaWAN, WiFi, WirelessHART, RFID and Cellular wireless communication protocols.

21. The Smart Wireless Adapter of claim 15, further comprising:
  one or more sensing devices configured to sense one or more parameters associated with the industrial system, wherein the Smart Wireless Adapter is configured to wirelessly transmit data indicative of the sensed parameters to the measurement control and data acquisition system.

22. A Smart Wireless Adapter for establishing communication between a digital Smart measurement device and a measurement control and data acquisition system in an industrial system, the Smart Wireless Adapter comprising:
  at least one processor;
  at least one memory device coupled to the at least one processor, the at least one processor and the at least one memory device configured to:
  receive at least one analog signal indicative of a value or values associated with one or more parameters measured by the digital Smart measurement device;
  receive at least one digital signal indicative of diagnostic information captured by the digital Smart measurement device;
  process the at least one analog signal and the at least one digital signal to generate one or more signals indicative of the at least one analog signal and the at least one digital signal, the one or more signals indicative of the at least one analog signal and the at least one digital signal provided in a form suitable for transmission to the measurement control and data acquisition system; and
  wirelessly transmit the one or more signals indicative of the at least one analog signal and the at least one digital signal;
  wherein one or more preferred modes of communication are communicated from the measurement control and data acquisition system to the Smart Wireless Adapter, the one or more preferred modes of communication including one or more wireless communication protocols; and
  wherein the preferred modes of communication include a plurality of preferred modes of communication, and further wherein the processing the at least one analog signal and the at least one digital signal to generate one or more signals indicative of the at least one analog signal and the at least one digital signal is performed based at least in part upon the one or more preferred modes of communication, and further wherein the wirelessly transmitting the one or more signals indicative of the at least one analog signal and the at least one digital signal includes the converted digital signal.

23. The Smart Wireless Adapter of claim 22, wherein the at least one analog signal and the at least one digital signal are superimposed on same loop wires, the loop wires coupled to at least one input of the Smart Wireless Adapter.

* * * * *